(12) United States Patent
Sakanaka et al.

(10) Patent No.: US 8,606,797 B2
(45) Date of Patent: Dec. 10, 2013

(54) INFORMATION PROCESSING APPARATUS AND INFORMATION PROCESSING METHOD

(75) Inventors: Motoe Sakanaka, Tokyo (JP); Yuki Sugiue, Tokyo (JP)

(73) Assignee: Sony Corporation, Tokyo (JP)

( * ) Notice: Subject to any disclaimer, the term of this patent is extended or adjusted under 35 U.S.C. 154(b) by 966 days.

(21) Appl. No.: 12/708,176

(22) Filed: Feb. 18, 2010

(65) Prior Publication Data

US 2010/0238183 A1 Sep. 23, 2010

(30) Foreign Application Priority Data

Mar. 18, 2009 (JP) ................................. 2009-066785

(51) Int. Cl.
*G06F 3/00* (2006.01)
*G06F 17/30* (2006.01)

(52) U.S. Cl.
USPC .......................................... 707/751; 715/708

(58) Field of Classification Search
USPC .................................. 715/705–713; 707/751
See application file for complete search history.

(56) References Cited

U.S. PATENT DOCUMENTS

| | | | | |
|---|---|---|---|---|
| 5,861,884 A * | 1/1999 | Fujioka | ........................ | 715/705 |
| 6,064,381 A * | 5/2000 | Harel | ........................... | 715/705 |
| 7,242,988 B1 * | 7/2007 | Hoffberg et al. | ................ | 700/28 |
| 7,493,294 B2 * | 2/2009 | Flinn et al. | ...................... | 706/12 |
| 7,516,406 B1 * | 4/2009 | Cameron | ...................... | 715/710 |
| 7,958,066 B2 * | 6/2011 | Pinckney et al. | ............... | 706/12 |
| 8,082,532 B1 * | 12/2011 | Stenz et al. | ................... | 716/123 |
| 8,095,174 B2 * | 1/2012 | Tomita | ....................... | 455/550.1 |
| 2001/0028603 A1 * | 10/2001 | Shimazu | ......................... | 368/10 |
| 2003/0106058 A1 * | 6/2003 | Zimmerman et al. | .......... | 725/46 |
| 2004/0201867 A1 * | 10/2004 | Katano | ........................ | 358/1.15 |
| 2006/0031402 A1 * | 2/2006 | Saito et al. | ..................... | 709/218 |
| 2006/0129547 A1 * | 6/2006 | Yamamoto et al. | ............... | 707/5 |
| 2008/0155472 A1 * | 6/2008 | Runge et al. | .................. | 715/811 |
| 2008/0209485 A1 * | 8/2008 | Emura | .......................... | 725/105 |
| 2009/0234793 A1 * | 9/2009 | Nishida | ........................... | 706/52 |
| 2010/0071005 A1 * | 3/2010 | Kusunoki | ....................... | 725/46 |
| 2012/0260165 A1 * | 10/2012 | Massoulie et al. | ............ | 715/708 |

FOREIGN PATENT DOCUMENTS

| | | |
|---|---|---|
| JP | 3-84611 | 4/1991 |
| JP | 10-51708 | 2/1998 |
| JP | 2005-309618 | 11/2005 |
| JP | 2008-113135 | 5/2008 |
| JP | 2008-217417 | 9/2008 |
| JP | 2008-243088 | 10/2008 |
| WO | WO 2007/148477 A1 | 12/2007 |
| WO | WO 2008/059710 A1 | 5/2008 |

OTHER PUBLICATIONS

Office Action issued Oct. 30, 2012, in Japanese Patent Application No. 2009-066785.

* cited by examiner

*Primary Examiner* — Jorge A Casanova
(74) *Attorney, Agent, or Firm* — Oblon, Spivak, McClelland, Maier & Neustadt, L.L.P.

(57) ABSTRACT

There is provided an information processing apparatus including a storage unit where function attribute information, user operation information, and recommendation degree information are recorded to be associated with one another, the attribute information indicating an attribute about a function of a predetermined device, the operation information indicating content of a predetermined user operation input to the device, and the degree information indicating a recommendation degree which serves as a reference for outputting, on a priority basis, display for recommending use of the function to a display apparatus, a recommendation degree information updating unit that updates, when a predetermined user operation is input, the degree information to increase the degree associated with function attribute information, and a recommended function determining unit that determines, based on the degree information recorded in the unit, a function with a highest degree as a recommended function.

15 Claims, 26 Drawing Sheets

FIG. 3

| FUNCTION | DEVICE | RECOMMENDATION Lv | COLLABORATION SERVICES | RECOMMENDATION POINTS |
|---|---|---|---|---|
| RECORDING RESERVATION | TV | Lv1 | SCHEDULE, TRAVEL | 5 |
| VOICEMAIL MESSAGE PLAYBACK | PHONE | Lv10 | SCHEDULE, TRAVEL | 0 |
| INTERNET SERVICES | TV | Lv1 | — | 3 |
| ... | | ... | ... | ... |

FIG. 4

| SERVICES | | FUNCTION | RECOMMENDATION TRIGGER |
|---|---|---|---|
| NAME OF SERVICE | EVENT | | |
| SCHEDULE | 11/28 TRAVEL | RECORDING RESERVATION | BEFORE EVENT |
| | | DIGITAL CAMERA PLAYBACK | AFTER EVENT |
| | | VOICEMAIL MESSAGE PLAYBACK | AFTER EVENT |
| | | . . . | . . . |
| SCHEDULE | 10/1 ATHLETIC MEET | DIGITAL CAMERA PLAYBACK | AFTER EVENT |
| | | . . . | . . . |
| . . . | . . . | . . . | . . . |

FIG. 5

| FUNCTION | USER OPERATION | RECOMMENDATION Lv |
|---|---|---|
| RECORDING RESERVATION | WATCH THE SAME PROGRAM THREE TIMES | Lv1 |
| VOICEMAIL MESSAGE PLAYBACK | TURN ON POWER | Lv10 |
| INTERNET SERVICES | PERFORM ZAPPING FIVE TIMES AN HOUR (1H) | Lv1 |
| . . . | . . . | . . . |

FIG. 7

| FUNCTION | NECESSARY CONDITION | INITIAL POINTS | FLUCTUATIONS IN RECOMMENDATION POINTS | FLUCTUATION POINTS | RECOMMENDATION TIMING |
|---|---|---|---|---|---|
| ELECTRONIC PROGRAM GUIDE | | 50 | RECEIVE A DIGITAL TERRESTRIAL BROADCAST FOR THE FIRST TIME | +30 | UPON ZAPPING |
| | | | VIEW A DIGITAL TERRESTRIAL BROADCAST FOR THE FIRST TIME | +50 | UPON ZAPPING |
| CURRENT PROGRAM GUIDE | | 40 | RECEIVE A DIGITAL TERRESTRIAL BROADCAST FOR THE FIRST TIME | +30 | BETWEEN PROGRAMS |
| | | | VIEW A DIGITAL TERRESTRIAL BROADCAST FOR THE FIRST TIME | +50 | BETWEEN PROGRAMS |
| PROGRAM DESCRIPTION (PROGRAM GUIDE) | ELECTRONIC PROGRAM GUIDE OR CURRENT PROGRAM GUIDE | 30 | USE AN ELECTRONIC PROGRAM GUIDE OR CURRENT PROGRAM GUIDE | +20 | BETWEEN PROGRAMS |
| PROGRAM INFORMATION OBTAINMENT (PROGRAM GUIDE) | ELECTRONIC PROGRAM GUIDE OR CURRENT PROGRAM GUIDE | 0 | USE AN ELECTRONIC PROGRAM GUIDE OR CURRENT PROGRAM GUIDE | +20 | BETWEEN PROGRAMS |
| | | | USE AN OPTION | +10 | BETWEEN PROGRAMS |
| CHANNEL DISPLAY SWITCHING (PROGRAM GUIDE) | ELECTRONIC PROGRAM GUIDE OR CURRENT PROGRAM GUIDE | 3 | USE AN ELECTRONIC PROGRAM GUIDE OR CURRENT PROGRAM GUIDE | +20 | BETWEEN PROGRAMS |
| | | | USE AN OPTION | +10 | BETWEEN PROGRAMS |
| SERVICE SWITCHING (PROGRAM GUIDE) | ELECTRONIC PROGRAM GUIDE OR CURRENT PROGRAM GUIDE | 1 | USE AN ELECTRONIC PROGRAM GUIDE OR CURRENT PROGRAM GUIDE | +20 | BETWEEN PROGRAMS |
| | | | USE AN OPTION | +10 | BETWEEN PROGRAMS |
| BROADCAST SWITCHING (PROGRAM GUIDE) | ELECTRONIC PROGRAM GUIDE OR CURRENT PROGRAM GUIDE | 2 | USE AN ELECTRONIC PROGRAM GUIDE OR CURRENT PROGRAM GUIDE | +20 | BETWEEN PROGRAMS |
| | | | USE AN OPTION | +10 | BETWEEN PROGRAMS |
| GENRE COLOR SETTING (PROGRAM GUIDE) | ELECTRONIC PROGRAM GUIDE OR CURRENT PROGRAM GUIDE | 4 | USE AN ELECTRONIC PROGRAM GUIDE OR CURRENT PROGRAM GUIDE | +20 | BETWEEN PROGRAMS |
| | | | USE AN OPTION | +10 | BETWEEN PROGRAMS |
| SEARCH FUNCTION (PROGRAM GUIDE) | ELECTRONIC PROGRAM GUIDE OR CURRENT PROGRAM GUIDE | 10 | USE AN ELECTRONIC PROGRAM GUIDE OR CURRENT PROGRAM GUIDE | +20 | WHEN RETURNED TO VIEWING FROM A PROGRAM GUIDE |
| | | | USE AN OPTION | +10 | BETWEEN PROGRAMS |
| | | | RECEIVE A BS/CS BROADCAST FOR THE FIRST TIME | +30 | BETWEEN PROGRAMS |
| | | | VIEW A BS/CS BROADCAST FOR THE FIRST TIME | +20 | BETWEEN PROGRAMS |
| FONT SIZE CHANGE (PROGRAM GUIDE) | ELECTRONIC PROGRAM GUIDE OR CURRENT PROGRAM GUIDE | 15 | USE AN ELECTRONIC PROGRAM GUIDE OR CURRENT PROGRAM GUIDE | +20 | WHEN RETURNED TO VIEWING FROM A PROGRAM GUIDE |
| | | | USE AN OPTION | +10 | BETWEEN PROGRAMS |
| | | | USE A ZOOM IN/ZOOM OUT FUNCTION | +10 | BETWEEN PROGRAMS |
| NEXT DAY (PROGRAM GUIDE) | ELECTRONIC PROGRAM GUIDE OR CURRENT PROGRAM GUIDE | 20 | USE AN ELECTRONIC PROGRAM GUIDE OR CURRENT PROGRAM GUIDE | +20 | WHEN RETURNED TO VIEWING FROM A PROGRAM GUIDE |
| | | | USE AN OPTION | +10 | BETWEEN PROGRAMS |
| | | | USE A COLOR KEY | +10 | BETWEEN PROGRAMS |
| | | | DISPLAY AN ELECTRONIC PROGRAM GUIDE FOR THE NEXT DAY OR LATER | +30 | BETWEEN PROGRAMS |

FIG. 8

| FUNCTION | NECESSARY CONDITION | INITIAL POINTS | FLUCTUATIONS IN RECOMMENDATION POINTS | FLUCTUATION POINTS | RECOMMENDATION TIMING |
|---|---|---|---|---|---|
| DATE/TIME SPECIFICATION JUMP (PROGRAM GUIDE) | ELECTRONIC PROGRAM GUIDE OR CURRENT PROGRAM GUIDE | 19 | USE AN ELECTRONIC PROGRAM GUIDE OR CURRENT PROGRAM GUIDE | +20 | WHEN RETURNED TO VIEWING FROM A PROGRAM GUIDE |
| | | | USE AN OPTION | +10 | BETWEEN PROGRAMS |
| | | | USE A COLOR KEY | +10 | BETWEEN PROGRAMS |
| | | | DISPLAY AN ELECTRONIC PROGRAM GUIDE FOR THE NEXT DAY OR LATER | +30 | BETWEEN PROGRAMS |
| | | | DISPLAY AN ELECTRONIC PROGRAM GUIDE FOR THE NEXT DAY | +30 | BETWEEN PROGRAMS |
| ZOOM IN/ ZOOM OUT (PROGRAM GUIDE) | ELECTRONIC PROGRAM GUIDE OR CURRENT PROGRAM GUIDE | 18 | USE AN ELECTRONIC PROGRAM GUIDE OR CURRENT PROGRAM GUIDE | +20 | WHEN RETURNED TO VIEWING FROM A PROGRAM GUIDE |
| | | | USE AN OPTION | +10 | BETWEEN PROGRAMS |
| | | | USE A COLOR KEY | +10 | BETWEEN PROGRAMS |
| | | | USE A FONT SIZE CHANGE FUNCTION | +10 | BETWEEN PROGRAMS |
| PHRASE EXTRACTION | VIEWING TREND DISPLAY | 5 | USE AN ELECTRONIC PROGRAM GUIDE OR CURRENT PROGRAM GUIDE | +20 | WHEN RETURNED FROM VIEWING RESERVATION OR RECORDING RESERVATION |
| | | | SEE PROGRAM DESCRIPTION | +10 | BETWEEN PROGRAMS |
| | | | SEE A RECOMMENDATION MADE BY PREFERENCE NAVIGATION | +20 | BETWEEN PROGRAMS |
| | | | MAKE A VIEWING RESERVATION | +10 | BETWEEN PROGRAMS |
| VIEWING RESERVATION | PROGRAM DESCRIPTION | 25 | USE AN ELECTRONIC PROGRAM GUIDE OR CURRENT PROGRAM GUIDE | +20 | IMMEDIATELY AFTER RETURNING TO VIEWING FROM PROGRAM DESCRIPTION OR WHEN A PROGRAM THAT THE USER SEES IN PROGRAM DESCRIPTION AND ACTUALLY WATCHES ENDS |
| | | | SEE PROGRAM DESCRIPTION | +10 | BETWEEN PROGRAMS |
| | | | WATCH THE SAME PROGRAM AS LAST WEEK | +10 | BETWEEN PROGRAMS |
| | | | USE A RECORDING RESERVATION FUNCTION | -100 | BETWEEN PROGRAMS |
| DATE SETTING (VIEWING RESERVATION) | VIEWING RESERVATION | 20 | WATCH THE SAME PROGRAM AS LAST WEEK | +20 | WHEN A VIEWING RESERVATION IS MADE FOR THE SAME PROGRAM A PLURALITY OF TIMES |
| RECORDING RESERVATION | HAVE PROGRAM DESCRIPTION AND AN APPROPRIATE DEVICE | 25 | USE ONE TOUCH RECORDING | +20 | BETWEEN PROGRAMS |
| | | | USE AN ELECTRONIC PROGRAM GUIDE OR CURRENT PROGRAM GUIDE | +20 | BETWEEN PROGRAMS |
| | | | SEE PROGRAM DESCRIPTION | +10 | BETWEEN PROGRAMS |
| | | | RECORD THE SAME PROGRAM AS LAST WEEK | +10 | BETWEEN PROGRAMS |
| | | | USE A VIEWING RESERVATION FUNCTION | -100 | BETWEEN PROGRAMS |

FIG. 9

| FUNCTION | NECESSARY CONDITION | INITIAL POINTS | FLUCTUATIONS IN RECOMMENDATION POINTS | FLUCTUATION POINTS | RECOMMENDATION TIMING |
|---|---|---|---|---|---|
| DATE SETTING (RECORDING RESERVATION) | RECORDING RESERVATION | 0 | RECORD THE SAME PROGRAM AS LAST WEEK | +20 | BETWEEN PROGRAMS |
| VIEWING TREND DISPLAY | | 0 | USE A FUNCTION RECOMMENDATION FUNCTION | +30 | BETWEEN PROGRAMS |
| BRIGHTNESS ADJUSTMENT | | 0 | USE OTHER ECO-FUNCTIONS | +30 | BETWEEN PROGRAMS |
| | | | USE AN IMAGE QUALITY ADJUSTMENT FUNCTION | +20 | BETWEEN PROGRAMS |
| POWER CONSUMPTION LEVEL DISPLAY | | 0 | USE OTHER ECO-FUNCTIONS | +30 | BETWEEN PROGRAMS |
| NO-OPERATION POWER-OFF | | 0 | USE OTHER ECO-FUNCTIONS | +30 | BETWEEN PROGRAMS |
| VIDEO PLAYBACK | | 0 | ABLE TO OBTAIN A PLAN SUCH AS TRAVEL OR ANNIVERSARY | +30 | BETWEEN PROGRAMS |
| | | | ABLE TO OBTAIN AN ITEM SUCH AS A DIGITAL VIDEO CAMERA OR DIGITAL CAMERA | +20 | BETWEEN PROGRAMS |
| | | | WATCH TRAVEL PROGRAMS A PLURALITY OF TIMES | +20 | BETWEEN PROGRAMS |
| | | | USE OTHER MEDIA SYSTEM'S PLAYBACK FUNCTIONS | +20 | BETWEEN PROGRAMS |
| PHOTO PLAYBACK | | 0 | USE AN IMAGE QUALITY ADJUSTMENT FUNCTION | +20 | BETWEEN PROGRAMS |
| | | | ABLE TO OBTAIN A PLAN SUCH AS TRAVEL OR ANNIVERSARY | +30 | BETWEEN PROGRAMS |
| | | | ABLE TO OBTAIN AN ITEM SUCH AS A USB MEMORY OR DIGITAL CAMERA | +30 | BETWEEN PROGRAMS |
| | | | WATCH TRAVEL PROGRAMS A PLURALITY OF TIMES | +20 | BETWEEN PROGRAMS |
| | | | USE OTHER MEDIA SYSTEM'S PLAYBACK FUNCTIONS | +20 | BETWEEN PROGRAMS |
| MUSIC PLAYBACK | | | ABLE TO OBTAIN AN ITEM SUCH AS A USB MEMORY, PC, OR PORTABLE MUSIC PLAYER | +30 | BETWEEN PROGRAMS |
| | | | WATCH MUSIC PROGRAMS A PLURALITY OF TIMES | +20 | BETWEEN PROGRAMS |
| | | | USE OTHER MEDIA SYSTEM'S PLAYBACK FUNCTIONS | +20 | BETWEEN PROGRAMS |
| ONE TOUCH MUTE KEY | | 0 | USE A MUTE KEY A PLURALITY OF TIMES | +30 | BETWEEN PROGRAMS |
| ONE TOUCH CHANNEL KEY | | 0 | SWITCH BETWEEN CHANNELS IMMEDIATELY AFTER TURNING ON POWER | +30 | BETWEEN PROGRAMS |
| CLOCK DISPLAY | | 0 | RECEIVE A DIGITAL TERRESTRIAL BROADCAST FOR THE FIRST TIME | +20 | BETWEEN PROGRAMS |
| EXTERNAL DEVICE LINK | THERE IS A LINKED DEVICE | 0 | ABLE TO OBTAIN AN ITEM SUCH AS A PC OR DIGITAL CAMERA | +30 | BETWEEN PROGRAMS |
| SLEEP TIMER | | 0 | USE AN ON-TIMER FUNCTION A PLURALITY OF TIMES | +20 | BETWEEN PROGRAMS |
| ON-TIMER | | 0 | USE A SLEEP TIMER FUNCTION A PLURALITY OF TIMES | +20 | BETWEEN PROGRAMS |
| | | | TURN ON POWER IN A CLOSE TIME ZONE | +30 | BETWEEN PROGRAMS |
| INTERNET SERVICES | INTERNET CONNECTION | 0 | USE OTHER INTERNET-BASED FUNCTIONS | +30 | BETWEEN PROGRAMS |
| | | | USE A TIME DISPLAY FUNCTION | +10 | BETWEEN PROGRAMS |
| | | | USE A VIDEO PLAYBACK FUNCTION | +20 | BETWEEN PROGRAMS |
| TWO-SCREEN DISPLAY | | 0 | PERFORM ZAPPING A PLURALITY OF TIMES | +20 | BETWEEN PROGRAMS |

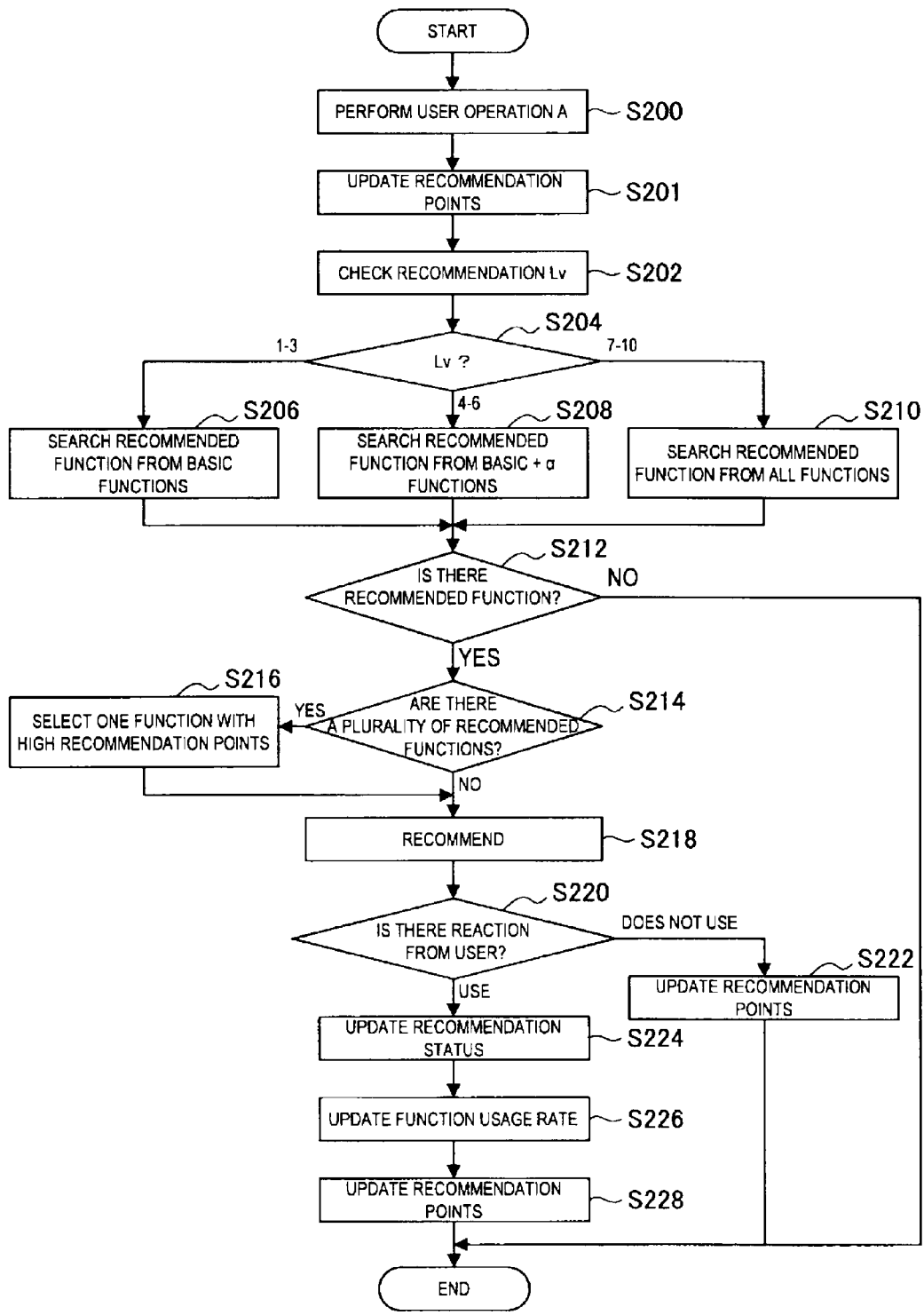

| | | | |
|---|---|---|---|
| 300 → | VIEWING RESERVATION | RECORDING RESERVATION | FONT SIZE CHANGE |
| 302 → | PROGRAM GUIDE | PROGRAM GUIDE | PROGRAM GUIDE |
| 304 → | INITIAL SETTING | INITIAL SETTING | INITIAL SETTING |

| | |
|---|---|
| RECORD/RESERVE A PROGRAM WITH A LINKED RECORDING DEVICE | 114 |
| RECOMMENDED ★ MAKE A RECORDING RESERVATION IN A PROGRAM GUIDE | 115 |
| POPULAR FUNCTION ● MAKE A VIEWING RESERVATION IN A PROGRAM GUIDE | 115 |
| MAKE A RECORDING RESERVATION BY SPECIFYING DATE/TIME | 116 |
| CHECK THE CONTENT OF A RESERVATION | 117 |
| CHECK/MODIFY A RESERVATION | 117 |
| CHECK TO SEE IF A RECORDING RESERVATION HAS BEEN MADE | 117 |

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

At present, information processing apparatuses are made multifunctional. In particular, a display screen of an information processing apparatus is made multifunctional.

For example, techniques for providing display on a display screen of an information processing apparatus based on a manipulation history are disclosed in, for example, Japanese Patent Application Laid-Open Nos. 2008-217417 and 2008-243088 shown below.

SUMMARY OF THE INVENTION

However, the techniques described in the above Japanese Patent Application Laid-Open Nos. 2008-217417 and 2008-243088 are limited to those which display information about functions that have been used by a user on a display screen based on a manipulation history to improve the convenience of manipulation of the functions. That is, in the techniques described in the above Japanese Patent Application Laid-Open Nos. 2008-217417 and 2008-243088, a recommendation is made only for already used functions and a recommendation is not made for those functions that have not been used.

In light of the foregoing, it is desirable to provided an information processing apparatus and an information processing method that can improve the convenience of finding a function suitable for a user by recommending a function that is not only based on a user's usage history of functions but is considered to be useful for the user.

According to an embodiment of the present invention, there is provided an information processing apparatus which includes a storage unit in which function attribute information, user operation information, and recommendation degree information are recorded so as to be associated with one another, the function attribute information indicating an attribute about a function of a predetermined device, the user operation information indicating content of a predetermined user operation input to the predetermined device, and the recommendation degree information indicating a recommendation degree which serves as a reference for outputting, on a priority basis, display for recommending use of the function to a display apparatus, a recommendation degree information updating unit that updates, when a user operation that matches the user operation information associated with a piece of function attribute information is input, the recommendation degree information to increase the recommendation degree associated with the piece of function attribute information, a recommended function determining unit that determines, based on the pieces of recommendation degree information recorded in the storage unit, a function with a highest recommendation degree as a recommended function, from among functions whose respective pieces of function attribute information are stored in the storage unit, and a display control unit that causes the display apparatus to provide recommendation display for recommending use of the determined recommended function.

Further, in the information processing apparatus, the storage unit may further record trigger information so as to be associated with the function attribute information, the trigger information indicating content of a user operation which serves as a trigger to cause the display apparatus to provide recommendation display, the information processing apparatus may further includes a recommendation display instructing unit that generates, when a user operation that matches a user operation associated with the trigger information is input, an instruction signal and outputs the instruction signal to the display control unit, the instruction signal being a signal for allowing the display control unit to perform control of the display apparatus, and in response to the instruction signal output from the recommendation display instructing unit, the display control unit may cause the display apparatus to provide the recommendation display.

Further, in the information processing apparatus, when a user operation is input to execute the recommended function determined by the recommended function determining unit and the input user operation matches a user operation associated with the function attribute information, the recommendation degree information updating unit may update the recommendation degree information to decrease the recommendation degree.

Further, the information processing apparatus may further include an external information obtaining unit that records in the storage unit external information that is obtained from one or two or more external devices which are communicable through a network and that includes the function attribute information, the user operation information, and the recommendation degree information of the one or two or more external devices.

Further, the information processing apparatus may further include a latest information updating unit that newly obtains the function attribute information, the user operation information, and the recommendation degree information through a network or based on a user input and updates the function attribute information, the user operation information, and the recommendation degree information which are recorded in the storage unit.

Further, in the information processing apparatus, the recommendation degree information updating unit may associate first function attribute information of a predetermined function with second function attribute information of a function used in association with the predetermined function, and when the predetermined function is executed, the recommendation degree information updating unit may increase both a recommendation degree associated with the first function attribute information and a recommendation degree associated with the second function attribute information.

Further, in the information processing apparatus, the function attribute information may include function manipulation explanation data which is data on a manipulation explanation of a function of the predetermined device, and the display control unit may provide display by including function manipulation explanation display for the function manipulation explanation data is included in the recommendation display.

Further, the information processing apparatus may further include a number-of-executions-of-recommended-function calculating unit that adds up a number of executions of a recommended function which indicates a number of times a function in relation to the recommendation display is executed by a user operation within a predetermined period of time, a function usage rate calculating unit that calculates a function usage rate which indicates a rate of a number of functions for which a usage history exists with respect to a number of all functions recorded in the storage unit a recommendation standard adjusting unit that adjusts a recommended function standard in accordance with fluctuations in the number of executions of a recommended function and the function usage rate, the recommended function standard defining a number of functions selectable as a recommended function by the recommended function determining unit, and a number-of-recommended-functions determining unit that determines a number of functions selectable as a recommended function, based on the recommended function standard. The recommended function determining unit may determine a function with a highest recommendation degree as a function to be recommended to a user, based on the determination made by the number-of-recommended-functions determining unit.

Further, in the information processing apparatus, the recommendation standard adjusting unit may adjust a recommendation timing standard in accordance with fluctuations in the number of executions of a recommended function and the function usage rate, the recommendation timing standard indicating timing at which the display control unit causes the display apparatus to provide the recommendation display, the information processing apparatus may further include a recommendation timing determining unit that determines timing at which the recommendation display can be provided, based on the recommendation timing standard, and the display control unit may cause the display apparatus to provide recommendation display for the recommended function at predetermined timing based on the determination made by the recommendation timing determining unit.

According to another embodiment of the present invention, there is provided an information processing method which includes the steps of, based on function attribute information, user operation information, and recommendation degree information which are entered in advance, the function attribute information indicating an attribute about a function of a predetermined device, the user operation information indicating content of a predetermined user operation input to the predetermined device, and the recommendation degree information indicating a recommendation degree which serves as a reference for outputting, on a priority basis, display for recommending use of the function to a display apparatus, updating, when a user operation that matches the user operation information associated with a piece of function attribute information is input, the recommendation degree information to increase the recommendation degree associated with the piece of function attribute information, determining, based on the recommendation degree information, a function with a highest recommendation degree as a recommended function, from among functions whose respective pieces of function attribute information are entered, and causing the display apparatus to provide recommendation display for recommending use of the determined recommended function.

According to another embodiment of the present invention, there can be provided a program for causing a computer to achieve functions of the above-described information processing apparatus. According to still another embodiment of the present invention, there can be provided a computer-readable recording medium having recorded therein the program.

As described above, according to the present invention, the convenience of finding a function suitable for a user can be improved by recommending a function that is not only based on a user's usage history of functions but is considered to be useful for the user.

BRIEF DESCRIPTION OF THE DRAWINGS

FIG. 3 is an illustrative diagram of a knowledge base included in the information processing apparatus according to the embodiment;

FIG. 4 is an illustrative diagram of service meta-information included in the information processing apparatus according to the embodiment;

FIG. 5 is an illustrative diagram of function meta-information included in the information processing apparatus according to the embodiment;

FIG. 7 is an illustrative diagram of the knowledge base included in the information processing apparatus according to the embodiment;

FIG. 8 is an illustrative diagram of the knowledge base included in the information processing apparatus according to the embodiment;

FIG. 9 is an illustrative diagram of the knowledge base included in the information processing apparatus according to the embodiment;

FIG. 10 is a diagram illustrating a flow of a method of recommending a function by the information processing apparatus according to the embodiment;

FIG. 24 is a diagram illustrating the display screen of the information processing apparatus according to the embodiment;

DETAILED DESCRIPTION OF THE EMBODIMENTS

Figure 1:
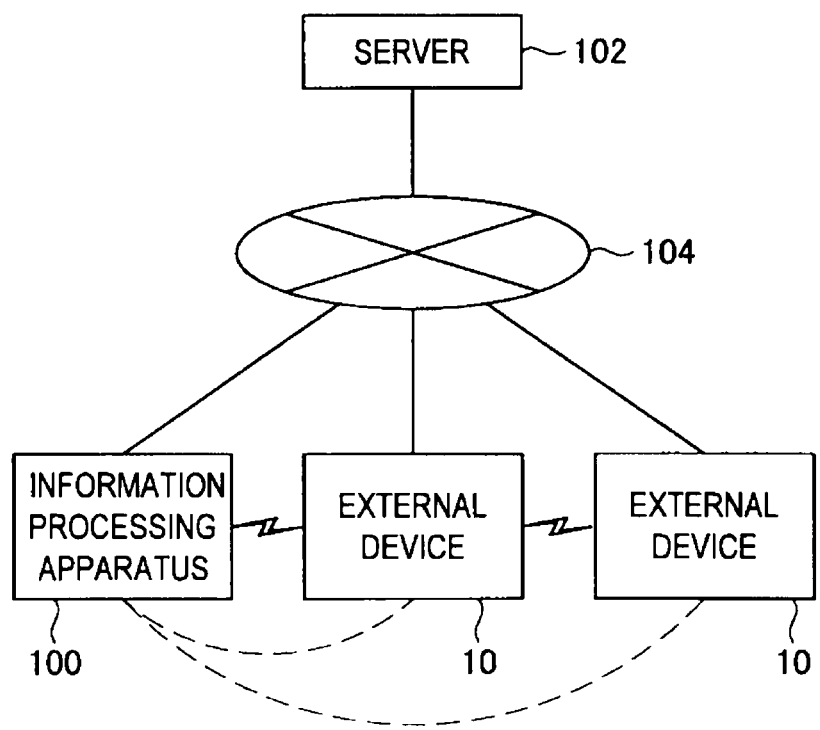
FIG. 1 is an illustrative diagram showing an information processing system having an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Regarding Flow of Description)

The flow of description herein is as follows. First, with reference to FIG. 1, a configuration of a network including an information processing apparatus according to an embodiment of the present invention will be described. Then, with reference to FIG. 2, a functional configuration of the information processing apparatus according to the embodiment will be described. Then, with reference to FIGS. 3 to 25, application examples of an information processing method according to an embodiment of the present invention will be described. Furthermore, with reference to FIG. 26, a hardware configuration that can achieve the function of the information processing apparatus according to the embodiment will be described. Finally, a technical idea of the embodiment will be summarized and actions and effects obtained from the technical idea will be briefly described.

1. Configuration example of network
2. Functional configuration of information processing apparatus 100
3. Application examples of information processing method
4. Hardware configuration example of information processing apparatus 100
5. Summary <1. Configuration Example of Network>

First, with reference to FIG. 1, a configuration of a network including an information processing apparatus according to an embodiment of the present invention will be described. FIG. 1 is an illustrative diagram showing a system configuration example of an information processing system 1 according to the embodiment.

As shown in FIG. 1, the information processing system 1 mainly has an information processing apparatus 100, a server 102, a communication network 104, and an external device 10.

The information processing apparatus 100 performs a process to output an output signal that recommends use of a function, based on user data by a user input and information about the external device 10 obtained from the server 102.

The information processing apparatus 100 will be described in detail again below. The information processing apparatus 100 according to the present embodiment can, for example, collect lists of functions of various home-use electrical appliances through an in-home network, etc., and obtain service information, etc., from various servers through the Internet, etc., and then present a recommended function to a user based on such pieces of information, a user's operation method and preferences, etc.

The server 102 provides apparatus function data transmitted from the external device 10, to the information processing apparatus 100. Examples of the external device 10 include apparatuses such as video game machines, portable game machines, mobile phones, components, air conditioners, digital cameras, personal computers (PCs), and notebook PCs.

The communication network 104 is a communication circuit network that establishes a connection between the information processing apparatus 100, the server 102, and the external device 10 such that they can perform two-way communication or one-way communication. The communication network 104 is configured by, for example, a public switched telephone network such as the Internet, an NGN (Next Generation Network), a telephone network, a satellite communication network, or a broadcast communication channel or a leased line network such as a WAN (Wide Area Network), a LAN (Local Area Network), an IP-VPN (Internet Protocol-Virtual Private Network), Ethernet (registered trademark), or a wireless LAN. It does not matter whether the communication network 104 is wired or wireless.

The server 102 provides information about the external device 10 obtained from the external device 10 through the communication network 104, to the information processing apparatus 100. The information processing apparatus 100 generates an output signal that recommends use of a function to the user, by processing the information about the external device 10 obtained from the server 102 and user data generated by the information processing apparatus 100 itself. Here, the output signal includes, for example, a video signal and an audio signal.

An example of the information processing apparatus 100 according to the present embodiment includes a television receiver. Since the television receiver has a display screen, an output signal which is a feature of the information processing apparatus 100 according to the present embodiment can be displayed on the display screen. Specifically, content corresponding to an output signal is displayed on a display screen and the user can select whether to use a recommended function by viewing the output signal. The information processing apparatus 100 is not limited to a television receiver. It is desirable that the information processing apparatus 100 have a display screen but the information processing apparatus 100 does not necessarily need to have a display screen. For example, the information processing apparatus 100 may be an apparatus that does not have a display screen, such as a radio. In such a case, for example, in the information processing apparatus 100, a function recommendation signal may be an audio signal and the user can select whether to use a recommended function by the audio signal.

<2. Functional Configuration of Information Processing Apparatus 100>

Figure 2:
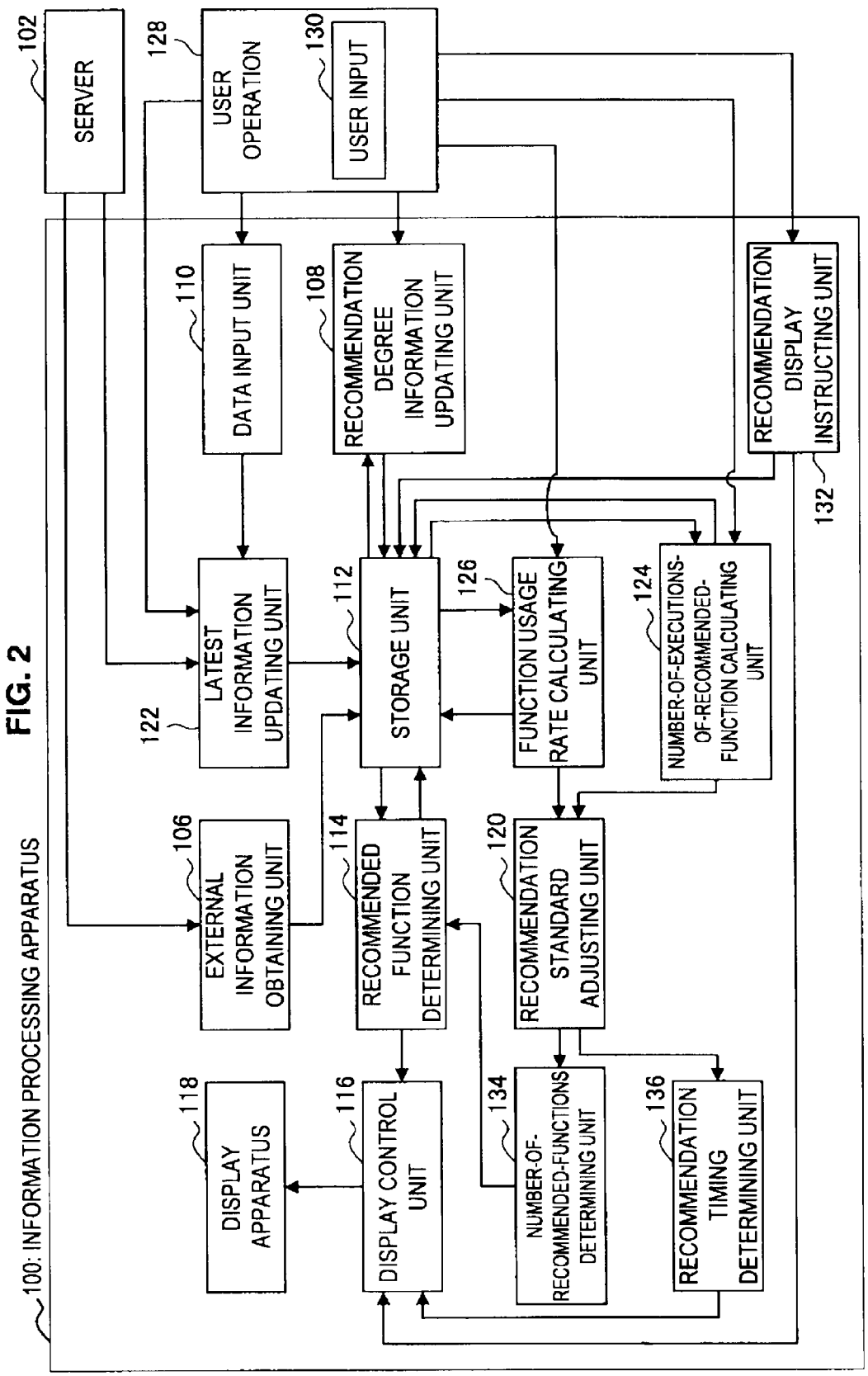
FIG. 2 is an illustrative diagram of a functional configuration of the information processing apparatus according to the embodiment.

Next, with reference to FIG. 2, a functional configuration of the information processing apparatus 100 will be described. FIG. 2 is an illustrative diagram showing a functional configuration example of the information processing apparatus 100 according to the present embodiment. The information processing apparatus 100 has a feature that the convenience of finding a function suitable for the user is improved by recommending a function that is not only based on a user's usage history of functions but is considered to be useful for the user.

The information processing apparatus 100 has an external information obtaining unit 106, a recommendation degree information updating unit 108, a data input unit 110, a storage unit 112, a recommended function determining unit 114, a display control unit 116, a display apparatus 118, and a recommendation standard adjusting unit 120. The information processing apparatus 100 further has a latest information updating unit 122, a number-of-executions-of-recommended-function calculating unit 124, a function usage rate calculating unit 126, a recommendation display instructing unit 132, a number-of-recommended-functions determining unit 134, and a recommendation timing determining unit 136.

First, the storage unit 112 has function attribute information, user operation information, and recommendation degree information. The function attribute information indicates an attribute about a function of a predetermined device. The user operation information indicates content of a predetermined user operation 128 input to the predetermined device. The user operation 128 may be an input of a command, etc., itself (user input 130) performed by the user. The recommendation degree information indicates a recommendation degree which serves as a reference for outputting, on a priority basis, display for recommending use of a function to the display apparatus 118. In the information processing apparatus 100 according to the present embodiment, a function whose recommendation degree information has the highest value is displayed on the display apparatus 118 as a recommended function, as will be described later.

Then, when a user operation 128 that matches the user operation information associated with the function attribute information is input, the recommendation degree information updating unit 108 updates the recommendation degree information to increase a recommendation degree associated with a piece of the function attribute information. In addition, when a predetermined function is executed, the recommendation degree information updating unit 108 may associate first function attribute information of the predetermined function with second function attribute information of a function used in association with the predetermined function. In this case, the recommendation degree information updating unit 108 can increase both a recommendation degree associated with the first function attribute information and a recommendation degree associated with the second function attribute information. For example, though described later, as an example of the recommendation degree information updating unit 108, it is assumed that, when the user is viewing a television receiver, the user makes a viewing reservation for a program. In this case, there may be a case in which it is desirable that the viewing reservation function be used together with a program guide display function, an initialization setting function, etc. In view of this, the recommendation degree information updating unit 108 can increase not only a recommendation degree of the viewing reservation function but also recommendation degrees of the program guide display function, the initialization setting function, etc. When, for example, the user recognizes the viewing reservation function but does not know that the viewing reservation function can be more efficiently used by executing the program guide display function and then executing the viewing reservation function, recommendation of the program guide display function contributes to an improvement in the user convenience of using functions.

Then, the recommended function determining unit 114 determines, based on the recommendation degree information stored in the storage unit 112, a function with the highest recommendation degree as a recommended function, from among functions whose respective pieces of function attribute information are stored in the storage unit 112. Then, the display control unit 116 causes the display apparatus 118 to provide recommendation display for recommending use of the determined recommended function. In this manner, in the information processing apparatus 100, by providing recommendation display on the display apparatus 118 based on recommendation degree information to recommend a function that is considered to be useful for the user, finding of a function suitable for the user is promoted, enabling to improve user convenience.

The storage unit 112 may have function manipulation explanation data. More specifically, the function attribute information may include function manipulation explanation data. The display control unit 116 can provide display such that function manipulation explanation display for the function manipulation explanation data is included in the recommendation display. The function manipulation explanation data is data on a manipulation explanation of a function of the predetermined device. Therefore, the user can find a function suitable for him/her without bothering to read a manual in book form, etc. In addition, the user may be allowed to watch a demonstration of a function by viewing video. In that case, learning of the function is speeded up. The user can practice manipulation by watching a manipulation method, which makes it easier for him/her to learn a function manipulation method.

In the storage unit 112, trigger information may be stored so as to be associated with the function attribute information. The trigger information indicates content of a user operation which serves as a trigger to cause the display apparatus 118 to provide recommendation display. In this case, when a user operation that matches a user operation associated with the trigger information is input, the recommendation display instructing unit 132 can generate an instruction signal which is a signal for allowing the display control unit 116 to perform control of the display apparatus 118. In this manner, by an operation performed by the user for a predetermined function acting as a trigger, the display control unit 116 can cause the display apparatus 118 to provide recommendation display. For example, though described later, it is assumed that the user is seeing a program guide on a television receiver which is an example of the information processing apparatus 100. By the user returning to the viewing of a program from the viewing of the program guide, a program guide search function can be recommended to the user. Hence, the user can view recommendation display after performing a predetermined user operation 128 and thus can timely execute a recommended function based on the recommendation display. That is, the possibility that recommendation display provided by the information processing apparatus 100 is profitable for the user increases.

There may be a case in which a user operation is input to execute by the user the recommended function determined by the recommended function determining unit 114 and the user operation that matches a user operation associated with the function attribute information is input. In this case, the recommendation degree information updating unit 108 can update the recommendation degree information to decrease the recommendation degree. Namely, by the user executing a function recommended by the information processing apparatus 100, the recommendation degree information in relation to the function decreases. Hence, those functions that are recommended once by the information processing apparatus 100 and executed by the user are less likely to be recommended. As a result, the information processing apparatus 100 recommends functions other than the above-mentioned functions and can accordingly recommend even those functions for which a user's usage history does not exist. That is, the user can efficiently learn functions.

The external information obtaining unit 106 can record in the storage unit 112 external information that is obtained from one or two or more external devices which are communicable through a network and that includes function attribute information, user operation information, and recommendation degree information of the one or two or more external devices. Therefore, the information processing apparatus 100 can recommend a function of not only the information processing apparatus 100 itself but also the external devices. In this manner, the information processing apparatus 100 can provide recommendation display for a function of not only the information processing apparatus 100 but also other external devices, on the display apparatus 118 based on recommendation degree information. Hence, in the information processing apparatus 100, by recommending a function of an external device that is considered to be useful for the user, the convenience of finding a function of the external device suitable for the user can be improved.

The latest information updating unit 122 can newly obtain the function attribute information, the user operation information, and the recommendation degree information through a network or based on a user input and record the updated function attribute information, the updated user operation information, and the updated recommendation degree information in the storage unit 112. More specifically, the latest information updating unit 122 can obtain newer information than the function attribute information, the user operation information, and the recommendation degree information stored in the storage unit 112 in relation to a certain time. The latest information updating unit 122 can also obtain newer information relative to a predetermined time from an external device through a network, etc. Thus, the information processing apparatus 100 can recommend a function to the user based on user preferences, today's fashion, etc. A newly added function or a function of a newly purchased apparatus can also be recommended to the user by the information processing apparatus 100.

The number-of-executions-of-recommended-function calculating unit 124 can add up the number of executions of a recommended function which indicates the number of times a function in relation to the recommendation display is executed by a user operation within a predetermined period of time. Here, the predetermined period of time indicates, for example, a period of time from when certain recommendation display is provided until next recommendation display is provided. Specifically, when, during a period from when certain recommendation display is provided until next recommendation display is provided, the user executes a function in relation to the certain recommendation display, the number-of-executions-of-recommended-function calculating unit 124 can add up the number of executions of the recommended function.

The function usage rate calculating unit 126 can calculate a function usage rate which indicates a rate of the number of functions for which a usage history exists with respect to the number of all functions recorded in the storage unit 112. For example, when the number of all functions recorded in the storage unit 112 is 65 and the number of functions for which a usage history exists is 34, the function usage rate is 34/65, i.e., about 0.52, and thus is about 52%.

The recommendation standard adjusting unit 120 can adjust a recommended function standard in accordance with fluctuations in the number of executions of a recommended function and the function usage rate. The recommended function standard defines the number of functions selectable as a recommended function by the recommended function determining unit 114. The number-of-recommended-functions determining unit 134 can determine the number of functions selectable as a recommended function, based on the recommended function standard. Then, the recommended function determining unit 114 can determine a function with the highest recommendation degree as a function to be recommended to the user, based on the determination made by the number-of-recommended-functions determining unit 134. For example, the recommendation standard adjusting unit 120 can increase the recommended function standard in accordance with an increase in the number of executions of a recommended function and the function usage rate. Then, the number-of-recommended-functions determining unit 134 can increase the number of functions selectable as a recommended function, in accordance with the increase in recommended function standard.

Furthermore, the recommendation standard adjusting unit 120 can adjust a recommendation timing standard which indicates timing at which the display control unit 116 causes the display apparatus 118 to provide the recommendation display, in accordance with fluctuations in the number of executions of a recommended function and the function usage rate. The recommendation timing standard indicates timing at which the display control unit 116 causes the display apparatus 118 to provide the recommendation display. The recommendation timing determining unit 136 can determine timing at which the recommendation display can be provided, based on the recommendation timing standard. For example, the recommendation standard adjusting unit 120 can shorten the recommendation timing standard in accordance with an increase in the number of executions of a recommended function and the function usage rate. Then, as the recommendation timing standard gets shorter, the timing at which a recommended function can be displayed by the display control unit 116 can be shortened. In this manner, recommendation timing and the number of recommended functions can be adjusted according to the use by the user of a function recommended by the information processing apparatus 100. For example, the higher the frequency of use of a recommended function by the user, the timing at which the information processing apparatus 100 makes a recommendation may be shortened and the number of functions recommended by the information processing apparatus 100 may increase. As a result, the user can get a feeling as if the information processing apparatus 100 is growing up and thus can accordingly get a sense of attachment to the information processing apparatus 100. In addition, since a function is recommended at a predetermined time according to user's function usage conditions, the user has less stress upon recommendation.

<3. Application Examples of Information Processing Method>

Next, with reference to FIGS. 3 to 24, application examples of an information processing method according to the present embodiment will be described. In the information processing method according to the present embodiment, a four-step process is performed in the order of (1) updating a knowledge base, (2) deciding on a recommendation, (3) making a recommendation, and (4) adjusting a recommended function standard. The process will be sequentially described in detail below.

(3-1. Regarding Knowledge Base)

First, with reference to FIGS. 3 to 5 and 6A to 6D, updating a knowledge base will be described. The knowledge base is an example of the storage unit 112 of the information processing apparatus 100 according to the present embodiment. The knowledge base which is an example of the storage unit 112 has function attribute information, user operation information, and recommendation degree information of a function of a predetermined device. As will be described later, the recommended function determining unit 114 determines a function to be recommended, based on the recommendation degree information, etc., in the knowledge base. The knowledge base can be used as a database.

Before describing the flow of updating the knowledge base, first, a specific example of the knowledge base will be described with reference to FIGS. 3 to 5. FIG. 3 shows an example of the knowledge base in table format. As shown in FIG. 3, the knowledge base includes function, device, recommendation Lv (level), collaboration services, and recommendation points. The "function" indicates a function that the user is recommended to use. The "device" indicates an apparatus having the recommended function. The "recommendation Lv" is an example of the recommended function standard. The recommendation Lv fluctuates according to the usage conditions of the recommended function. The recommendation standard adjusting unit 120 adjusts the recommendation Lv and the number-of-recommended-functions determining unit 134 determines the number of functions recommended by the recommended function determining unit 114. The recommendation standard adjusting unit 120 adjusts the recommendation Lv and the recommendation timing determining unit 136 determines timing of recommendation display provided by the display control unit 116. For example, as the recommendation standard adjusting unit 120 increases the recommendation Lv, the timing at which the display control unit 116 provides display can be shortened or the number of functions recommended by the recommended function determining unit 114 can be increased. An example of the case in which the number of functions recommended increases is as follows. For example, at a predetermined recommendation Lv or less, the recommended function determining unit 114 recommends only a function of the information processing apparatus 100 itself, but at higher than the predetermined recommendation Lv, the recommended function determining unit 114 also recommends a function of an external device other than the information processing apparatus 100. That is, by the increase in recommendation Lv, the user can get a feeling as if the information processing apparatus 100 is growing up and thus can get a sense of attachment to the information processing apparatus 100.

The "collaboration services" corresponds to service meta-information, as will be described later. The collaboration services or the service meta-information will be described in detail later with reference to FIG. 4.

The "recommendation points" is an example of the recommendation degree and is set for each function of the predetermined device and serves as a reference for outputting, on a priority basis, display for recommending use of the function to the display apparatus 118. In a specific example, when the user newly connects an external device such as a VCR to a television receiver which is an example of the information processing apparatus 100, the recommendation degree information updating unit 108 can increase recommendation points of a link function of the information processing apparatus 100 and a function of splitting a display screen of the information processing apparatus 100 into two parts. In another specific example, when a travel plan is input by the user in a schedule table of a calendar application on an information processing apparatus such as a PC, the recommendation degree information updating unit 108 can increase recommendation points of photo playback. The recommended function determining unit 114 recommends a function at predetermined timing based on trigger information. When there are a plurality of functions to be recommended, the recommended function determining unit 114 recommends a function with high recommendation points. When a function by a user operation 128 matches a function determined by the recommended function determining unit 114 and recommended to the user, the recommendation degree information updating unit 108 can subtract predetermined points from recommendation points of the function. Thus, by the recommendation degree information updating unit 108 decreasing recommendation points of those functions that are recommended once or that are already used, the same function can be prevented from being repeatedly and successively recommended or an already used function can be prevented from being recommended. The recommendation degree information may be ranking information. The ranking information will be described in detail later with reference to FIGS. 11 to 16. In this manner, for those functions that are recommended once and used by the user, since the recommendation degree values of the functions are subjected to subtraction and thus the recommendation degrees of the functions are lower than those of other functions, the functions are less likely to be immediately recommended by the information processing apparatus 100. In addition, for those functions that are recommended once and used by the user, since a predetermined value is subtracted from the recommendation degrees of the functions, a function that has not been used by the user can be recommended upon next recommendation by the information processing apparatus 100. That is, those functions that have not been used ever before by the user or functions of other devices can also be recommended to the user, which makes it easier for the user to make a full use of devices.

The knowledge base includes two pieces of meta-information, i.e., service meta-information and function meta-information. FIG. 4 shows an example of the service meta-information in table format. FIG. 5 shows an example of function meta-information in table format.

As shown in FIG. 4, the service meta-information is information about timing at which a function is recommended for an entry such as an event recorded on the information processing apparatus 100, and is an example of the trigger information. For example, as shown in FIG. 4, the "name of service" indicates the name of a service. The "event" indicates the name of an event. The "function" indicates information about a function recorded in the storage unit 112. The "recommendation trigger" indicates which timing the function is to be recommended at. For example, when a schedule includes an event to travel on November 28, trigger information that recommends a function of making a recording reservation for a television program, at timing that is a predetermined amount of time before travel is recorded in the storage unit 112. In another example, when a schedule includes an event to participate in an athletic meet on October 1, trigger information that recommends a function of playing back a digital camera, at timing that is a predetermined amount of time after participation in the athletic meet is recorded in the storage unit 112. In this manner, according to trigger information and based on an instruction signal generated by the recommendation display instructing unit 132, the display control unit 116 causes the display apparatus 118 to provide recommendation display for recommending use of a recommended function, at a predetermined time.

As shown in FIG. 5, the function meta-information is information about functions for each apparatus such as an information processing apparatus or a game device, and has a "user operation" entered therein which is required for a recommendation degree to fluctuate. The "function" indicates information about a function recorded in the storage unit 112. For example, in order for the recommended function determining unit 114 to recommend a function of making a recording reservation in FIG. 5, the recommendation degree of the function needs to be increased by a user operation 128 "watch the same program three times". Then, when the "recommendation Lv" is Lv1, the recommended function determining unit 114 can recommend the recording reservation function. In another example, in order for the recommended function determining unit 114 to recommend a function of playing back voicemail messages, the recommendation degree of the function needs to be increased by a user operation 128 "turn on power" to the information processing apparatus 100. Then, when the recommendation Lv is Lv10, the recommended function determining unit 114 can recommend the voicemail message playback function. That is, when the recommendation standard adjusting unit 120 decides that the recommendation Lv is Lv10, the recommended function determining unit 114 can determine to recommend the voicemail message playback function. In still another example, in order for the recommended function determining unit 114 to recommend an Internet service function, the recommendation degree of the function needs to be increased by a user operation 128 "perform zapping five times an hour (1 H)". Then, when the recommendation Lv is Lv1, the recommended function determining unit 114 can recommend the Internet service function.

Referring back to FIG. 3, description will be made. For example, regarding recommendation of the function of making a recording reservation, when the recommendation Lv is Lv1 and a user operation 128 that the same program is watched three times is performed, the recommended function determining unit 114 determines to recommend the function of making a recording reservation for a television program. Alternatively, before traveling (as shown in FIG. 4, before a predetermined period of time on November 28), the recommended function determining unit 114 determines to recommend the function of making a recording reservation for a television program.

Next, an update of the above-described knowledge base will be described with reference to a flow in FIGS. 6A to 6D. FIGS. 6A to 6D are each a diagram illustrating the flow of updating the knowledge base.

Figure 6A:
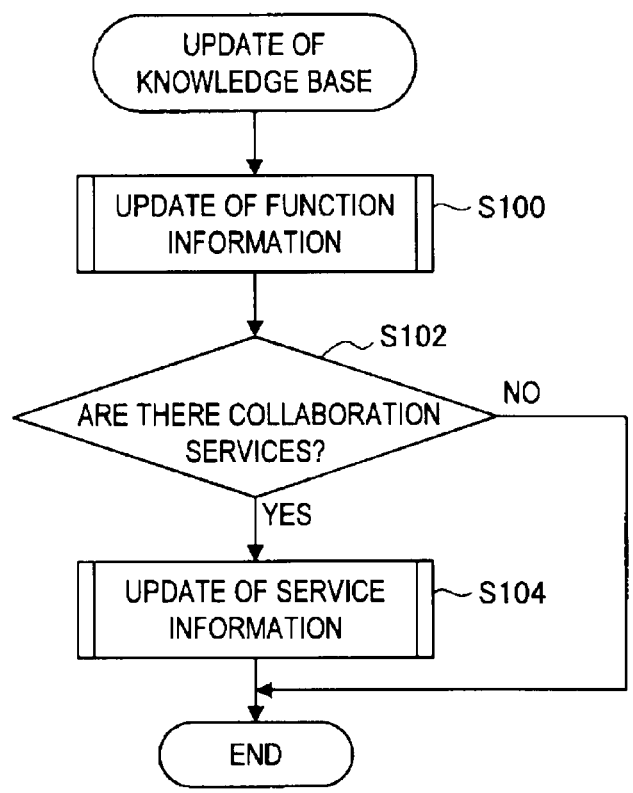
FIG. 6A is a diagram illustrating a flow of updating the knowledge base included in the information processing apparatus according to the embodiment.

As shown in FIG. 6A, the recommendation degree information updating unit 108 updates the knowledge base. First, the recommendation degree information updating unit 108 updates function information (S100). The function information indicates, for example, information including function meta-information such as that described above. Then, if there are collaboration services (S102), the recommendation degree information updating unit 108 updates service information (S104). The collaboration services and the service information each include service meta-information included in the knowledge base, such as that described with reference to FIGS. 3 to 5.

Figure 6B:
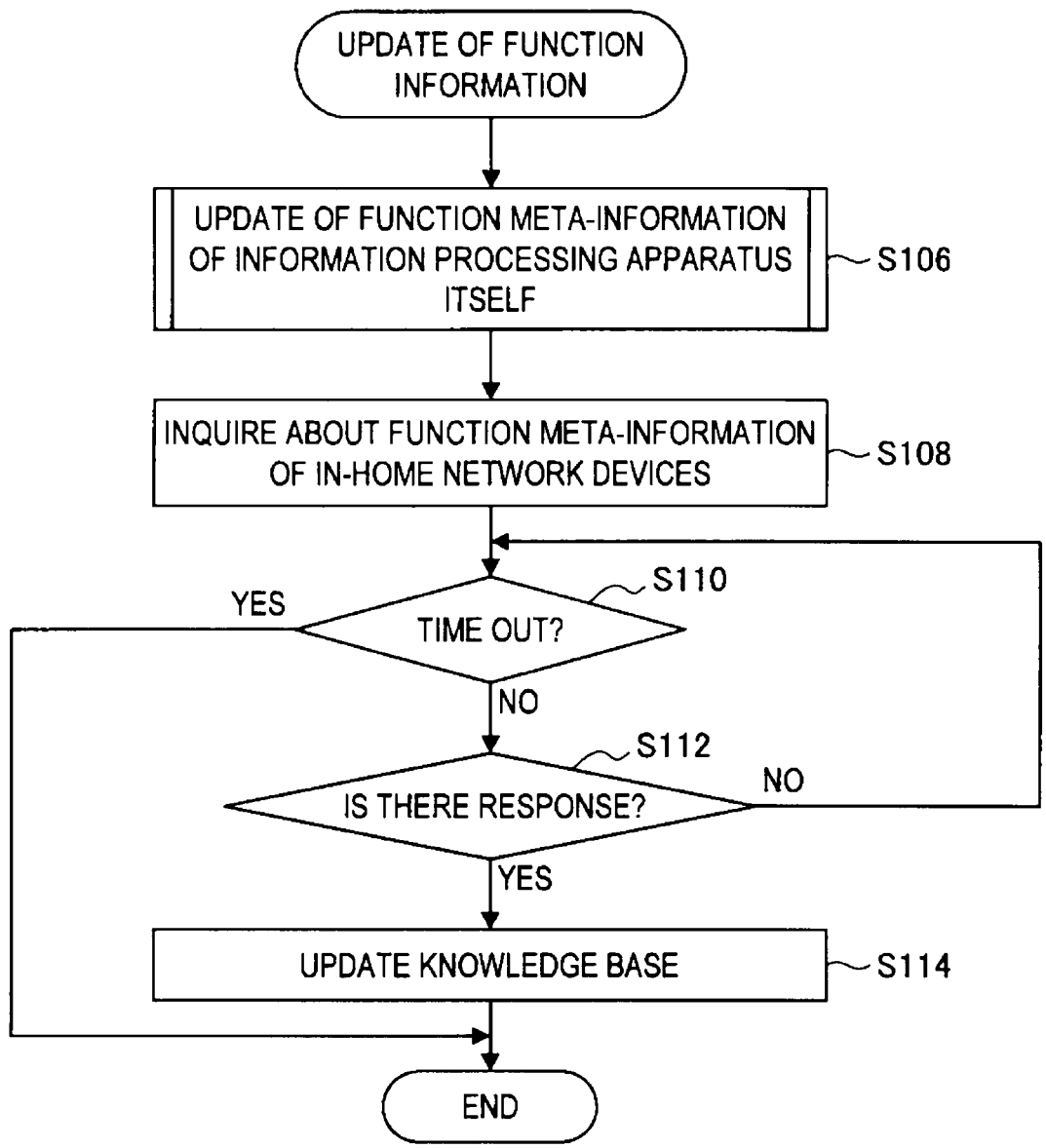
FIG. 6B is a diagram illustrating the flow of updating the knowledge base included in the information processing apparatus according to the embodiment.

The update of the function information is shown in FIG. 6B. As shown in FIG. 6B, the latest information updating unit 122 updates function meta-information of the information processing apparatus 100 itself (S106). An example of the function meta-information includes the function meta-information described with reference to FIGS. 3 to 5. Then, the latest information updating unit 122 inquires about function meta-information of in-home network devices through the server 102 (S108). If the latest information updating unit 122 receives a response to the inquiry within a predetermined period of time, then the latest information updating unit 122 updates the knowledge base (S110, S112, and S114). On the other hand, if the latest information updating unit 122 does not receive a response within the predetermined period of time, then the latest information updating unit 122 completes the update of the function information (S110 and S112).

Figure 6C:
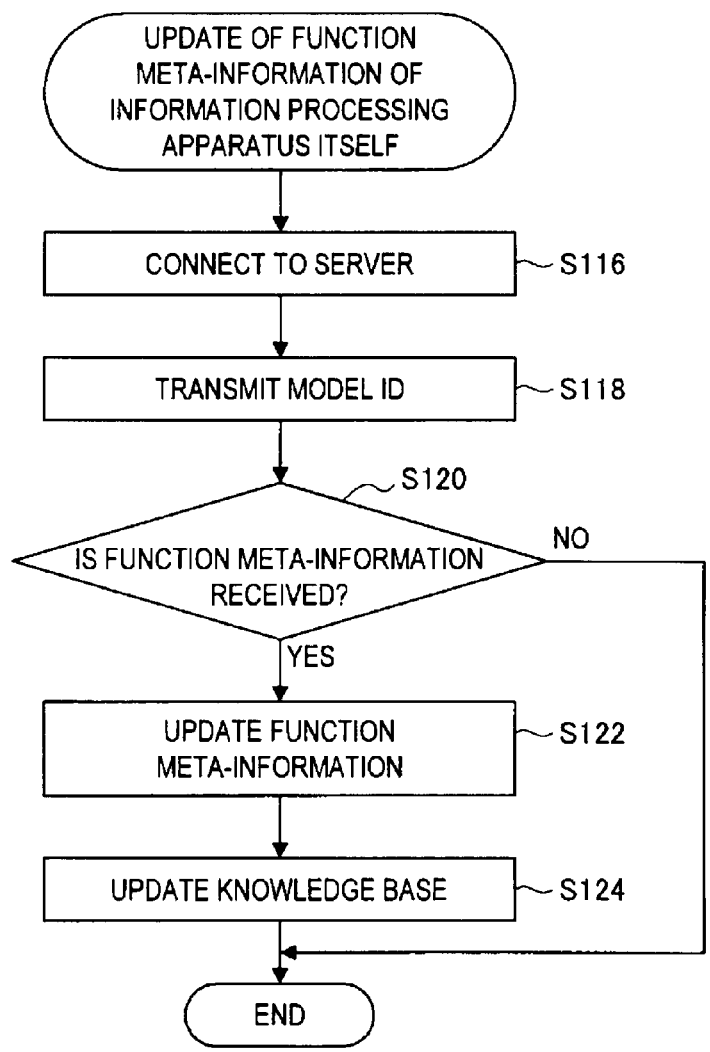
FIG. 6C is a diagram illustrating the flow of updating the knowledge base included in the information processing apparatus according to the embodiment.
Figure 6D:
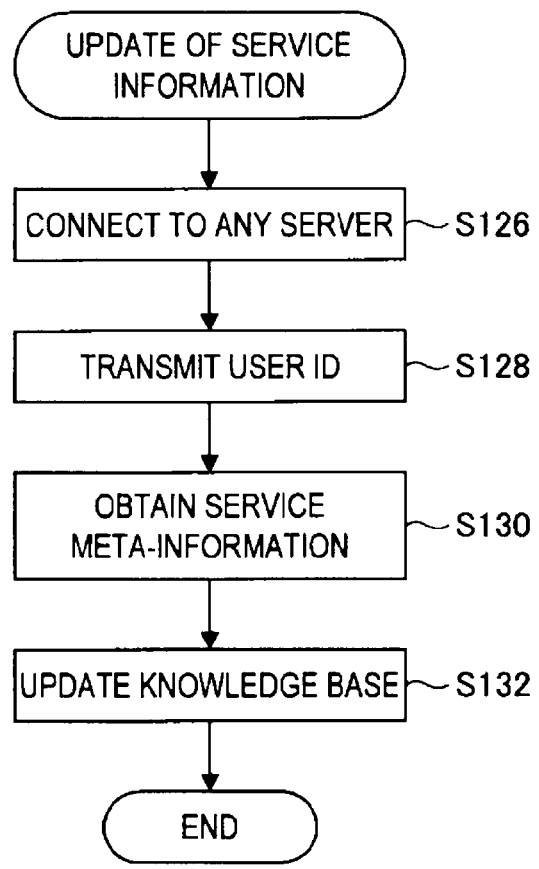
FIG. 6D is a diagram illustrating the flow of updating the knowledge base included in the information processing apparatus according to the embodiment.

The update of the function meta-information of the information processing apparatus 100 itself is shown in FIG. 6C. As shown in FIG. 6C, the latest information updating unit 122 attempts to connect to a predetermined server (S116). Specifically, the latest information updating unit 122 transmits a signal for connecting to the server 102 to cause the server 102 to transmit a model ID (IDentification) (S118). The model ID is type identification information for each device. As a result, when the latest information updating unit 122 receives new function meta-information from the server 102, the latest information updating unit 122 updates the function meta-information (S120 and S122). Then, the latest information updating unit 122 updates the knowledge base (S124). The update of the service information is shown in FIG. 6D. As shown in FIG. 6D, the latest information updating unit 122 attempts to connect to a predetermined server (S126). Specifically, the latest information updating unit 122 transmits a user ID to the server 102 (S128). The user ID is identification information for each user. As a result, when the latest information updating unit 122 receives new service meta-information from the server 102, the latest information updating unit 122 updates the service meta-information (S130). Then, the latest information updating unit 122 updates the knowledge base (S132).

Note that there may be various timings at which the latest information updating unit 122 updates the knowledge base. For example, the timing may be when the power is tuned on or when a new device is connected to an in-home network. Alternatively, the latest information updating unit 122 may regularly update the knowledge base every predetermined time.

Note also that the knowledge base is recorded in the storage unit 112 upon manufacturing the information processing apparatus 100. Thus, when the information processing apparatus 100 is not connected to a network, the knowledge base does not include collaboration services or function information of in-home network devices. In such a case, a function to be recommended by the information processing apparatus 100 can be any of the functions of the information processing apparatus 100.

Now, a more specific example of the aforementioned knowledge base is shown in FIGS. 7 to 9. The "function" indicates a function that the recommended function determining unit 114 can determine to recommend, and is an example of a function in relation to function attribute information. The "necessary condition" indicates a condition for a function, etc., that is required for the function to be used. The "initial points" is an example of a recommendation degree stored in advance in the storage unit 112. The "fluctuations in recommendation points" indicates a condition for recommendation points which are an example of the recommendation degree to fluctuate. The "fluctuation points" indicates the aforementioned recommendation points which increase and decrease by a user operation. The "recommendation timing" is an example of the trigger information. That is, for each function, when the necessary condition is satisfied and a user operation that matches a user operation associated with the "recommendation timing" is input, the function is recommended. The likelihood of recommendation of each function is determined based on the level of points that are obtained as a result of fluctuations by fluctuation points from initial points.

A function related to an electronic program guide indicates a function of displaying an electronic program guide on a display screen. For the function related to an electronic program guide, the initial points are initially 50 points. Then, when the user receives a digital terrestrial broadcast for the first time, the recommendation degree information updating unit 108 adds 30 points to the initial points. Timing at which the electronic program guide function is recommended is determined at the time when the recommendation display instructing unit 132 obtains an operation signal indicating that the user is zapping, and the recommendation display instructing unit 132 transmits an instruction signal to the display control unit 116. In addition, for the electronic program guide function, when the user views a digital terrestrial broadcast for the first time, the recommendation degree information updating unit 108 adds 50 points to the initial points.

A function related to a current program guide indicates a function of displaying a program guide for a program being currently broadcast, on a display screen. For the function related to a current program guide, the initial points are initially 40 points. Then, when the user receives a digital terrestrial broadcast for the first time, the recommendation degree information updating unit 108 adds 30 points to the initial points. Timing at which the current program guide function is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the current program guide function, when the user views a digital terrestrial broadcast for the first time, the recommendation degree information updating unit 108 adds 50 points to the initial points.

A function related to program description (program guide) indicates a function of displaying content description of a program provided in a program guide, on a display screen. For the function related to program description (program guide), the necessary condition for adding points to the recommendation points is that the user is viewing a program related to an electronic program guide or program description. For the function related to program description (program guide), the initial points are initially 30 points. Then, when the user uses an electronic program guide or a program guide for a program being currently broadcast, the recommendation degree information updating unit 108 adds 20 points to the initial points. Timing at which the function related to program description (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116.

A function related to program information obtainment (program guide) indicates a function of displaying program information provided in a program guide, on a display screen. For the function related to program information obtainment (program guide), the necessary condition for adding points to the recommendation points is that the user is viewing a program related to an electronic program guide or program description. For the function related to program information obtainment (program guide), the initial point is initially 0 point. Then, when the user uses an electronic program guide or a program guide for a program being currently broadcast, the recommendation degree information updating unit 108 adds 20 points to the initial points. Timing at which the function related to program information obtainment (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to program information obtainment (program guide), when the user uses an optional function for a program guide, the recommendation degree information updating unit 108 adds 10 points to the initial points.

A function related to channel display switching (program guide) indicates a function of switching between channel displays provided in a program guide. For the function related to channel display switching (program guide), the necessary condition for adding points to the recommendation points is that the user is viewing a program related to an electronic program guide or program description. For the function related to channel display switching (program guide), the initial points are initially 3 points. Then, when the user uses an electronic program guide or a program guide for a program being currently broadcast, the recommendation degree information updating unit 108 adds 20 points to the initial points. Timing at which the function related to channel display switching (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to channel display switching (program guide), when the user uses an optional function for channel display switching, the recommendation degree information updating unit 108 adds 10 points to the initial points.

A function related to service switching (program guide) indicates a function of switching between service displays provided in a program guide. For the function related to service switching (program guide), the necessary condition for adding points to the recommendation points is that the user is viewing a program related to an electronic program guide or program description. For the function related to service switching (program guide), the initial points are initially 1 point. Then, when the user uses an electronic program guide or a program guide for a program being currently broadcast, the recommendation degree information updating unit 108 adds 20 points to the initial points. Timing at which the function related to service switching (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to service switching (program guide), when the user uses an optional function for service switching, the recommendation degree information updating unit 108 adds 10 points to the initial points.

A function related to broadcast switching (program guide) indicates a function of switching between various broadcasts such as digital terrestrial broadcasts and satellite broadcasts provided in a program guide. For the function related to broadcast switching (program guide), the necessary condition for adding points to the recommendation points is that the user is viewing a program related to an electronic program guide or program description. For the function related to broadcast switching (program guide), the initial points are initially 2 points. Then, when the user uses an electronic program guide or a program guide for a program being currently broadcast, the recommendation degree information updating unit 108 adds 20 points to the initial points. Timing at which the function related to broadcast switching (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to broadcast switching (program guide), when the user uses an optional function for broadcast switching, the recommendation degree information updating unit 108 adds 10 points to the initial points.

A function related to genre color setting (program guide) indicates a function of setting a color displayed on a genre-by-genre basis in a program guide. For the function related to genre color setting (program guide), the necessary condition for adding points to the recommendation points is that the user is viewing a program related to an electronic program guide or program description. For the function related to genre color setting (program guide), the initial points are initially 4 points. Then, when the user uses an electronic program guide or a program guide for a program being currently broadcast, the recommendation degree information updating unit 108 adds 20 points to the initial points. Timing at which the function related to genre color setting (program guide) is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to genre color setting (program guide), when the user uses an optional function for genre color setting, the recommendation degree information updating unit 108 adds 10 points to the initial points.

A function related to a search function (program guide) indicates a function of using a search function of a program guide. For the function related to a search function (program guide), the necessary condition for adding points to the recommendation points is that the user is viewing a program related to an electronic program guide or program description. For the function related to a search function (program guide), the initial points are initially 10 points. Then, when the user uses an electronic program guide or a program guide for a program being currently broadcast, the recommendation degree information updating unit 108 adds 20 points to the initial points. Timing at which the function related to a search function (program guide) is recommended is determined at the time when the recommendation display instructing unit 132 obtains information indicating that the user returns to a program viewing state from a state in which the user is seeing a program guide, and the recommendation display instructing unit 132 transmits an instruction signal to the display control unit 116. In addition, for the function related to a search function (program guide), when the user uses an optional function for the search function, the recommendation degree information updating unit 108 adds 10 points to the initial points. In addition, for the function related to a search function (program guide), when the user receives a BS/CS broadcast for the first time, the recommendation degree information updating unit 108 adds 30 points to the initial points. Furthermore, for the function related to a search function (program guide), when the user views a BS/CS broadcast for the first time, the recommendation degree information updating unit 108 adds 20 points to the initial points.

A function related to font size change (program guide) indicates a function of changing the size of a font displayed on a program guide. For the function related to font size change (program guide), the necessary condition for adding points to the recommendation points is that the user is viewing a program related to an electronic program guide or program description. For the function related to font size change (program guide), the initial points are initially 15 points. Then, when the user uses an electronic program guide or a program guide for a program being currently broadcast, the recommendation degree information updating unit 108 adds 20 points to the initial points. Timing at which the function related to font size change (program guide) is recommended is determined at the time when the recommendation display instructing unit 132 obtains information indicating that the user returns to a program viewing state from a state in which the user is seeing a program guide, and the recommendation display instructing unit 132 transmits an instruction signal to the display control unit 116. In addition, for the function related to font size change (program guide), when the user uses an optional function for the font size change function, the recommendation degree information updating unit 108 adds 10 points to the initial points. In addition, for the function related to font size change (program guide), when the user uses a zoom in/zoom out function, the recommendation degree information updating unit 108 adds 10 points to the initial points.

A function related to the next day (program guide) indicates a function of displaying a program guide for the next day in a program guide. For the function related to the next day (program guide), the necessary condition for adding points to the recommendation points is that the user is viewing a program related to an electronic program guide or program description. For the function related to the next day (program guide), the initial points are initially 20 points. Then, when the user uses an electronic program guide or a program guide for a program being currently broadcast, the recommendation degree information updating unit 108 adds 20 points to the initial points. Timing at which the function related to the next day (program guide) is recommended is determined at the time when the recommendation display instructing unit 132 obtains information indicating that the user returns to a program viewing state from a state in which the user is seeing a program guide, and the recommendation display instructing unit 132 transmits an instruction signal to the display control unit 116. In addition, for the function related to the next day (program guide), when the user uses an optional function for the function related to the next day (program guide), the recommendation degree information updating unit 108 adds 10 points to the initial points. In addition, for the function related to the next day (program guide), when the user uses a color key on a remote control, the recommendation degree information updating unit 108 adds 10 points to the initial points. Furthermore, for the function related to the next day (program guide), when the user causes an electronic program guide for the next day or later to be displayed, the recommendation degree information updating unit 108 adds 30 points to the initial points.

A function related to date/time specification jump (program guide) indicates the execution of a date/time specification jump function in a program guide. For the function related to date/time specification jump (program guide), the necessary condition for adding points to the recommendation points is that the user is viewing a program related to an electronic program guide or program description. For the function related to date/time specification jump (program guide), the initial points are initially 19 points. Then, when the user uses an electronic program guide or a program guide for a program being currently broadcast, the recommendation degree information updating unit 108 adds 20 points to the initial points. Timing at which the function related to date/time specification jump (program guide) is recommended is determined at the time when the recommendation display instructing unit 132 obtains information indicating that the user returns to a program viewing state from a state in which the user is seeing a program guide, and the recommendation display instructing unit 132 transmits an instruction signal to the display control unit 116. In addition, for the function related to date/time specification jump (program guide), when the user uses an optional function for the function related to date/time specification jump (program guide), the recommendation degree information updating unit 108 adds 10 points to the initial points. In addition, for the function related to date/time specification jump (program guide), when the user uses a color key on the remote control, the recommendation degree information updating unit 108 adds 10 points to the initial points. Furthermore, for the function related to date/time specification jump (program guide), when the user causes an electronic program guide for the next day or later to be displayed, the recommendation degree information updating unit 108 adds 30 points to the initial points. Furthermore, for the function related to date/time specification jump (program guide), when the user causes an electronic program guide for the next day to be displayed, the recommendation degree information updating unit 108 adds 30 points to the initial points.

A function related to zoom-in/zoom out (program guide) indicates the use of a zoom in/zoom out function of a program guide. For the function related to zoom in/zoom out (program guide), the necessary condition for adding points to the recommendation points is that the user is viewing a program related to an electronic program guide or program description. For the function related to zoom in/zoom out (program guide), the initial points are initially 18 points. Then, when the user uses an electronic program guide or a program guide for a program being currently broadcast, the recommendation degree information updating unit 108 adds 20 points to the initial points. Timing at which the function related to zoom in/zoom out (program guide) is recommended is determined at the time when the recommendation display instructing unit 132 obtains information indicating that the user returns to a program viewing state from a state in which the user is seeing a program guide, and the recommendation display instructing unit 132 transmits an instruction signal to the display control unit 116. In addition, for the function related to zoom in/zoom out (program guide), when the user uses an optional function for the function related to zoom in/zoom out (program guide), the recommendation degree information updating unit 108 adds 10 points to the initial points. In addition, for the function related to zoom in/zoom out (program guide), when the user uses a color key on the remote control, the recommendation degree information updating unit 108 adds 10 points to the initial points. Furthermore, for the function related to zoom in/zoom out (program guide), when the user changes font size, the recommendation degree information updating unit 108 adds 10 points to the initial points.

A function related to phrase extraction indicates a function of extracting a phrase. For the function related to phrase extraction, the necessary condition for adding points to the recommendation points is that the user is using a preference navigation function. For the function related to phrase extraction, the initial points are initially 5 points. Then, when the user uses an electronic program guide or a program guide for a program being currently broadcast, the recommendation degree information updating unit 108 adds 20 points to the initial points. Timing at which the function related to phrase extraction is recommended is determined at the time when the recommendation display instructing unit 132 obtains information indicating that the user returns to a program viewing state from a state in which the user is making a viewing reservation or a recording reservation, and the recommendation display instructing unit 132 transmits an instruction signal to the display control unit 116. In addition, for the function related to phrase extraction, when the user sees program description, the recommendation degree information updating unit 108 adds 10 points to the initial points. In addition, for the function related to phrase extraction, when the user sees a recommendation made by the preference navigation, the recommendation degree information updating unit 108 adds 20 points to the initial points. Furthermore, for the function related to phrase extraction, when the user makes a viewing reservation, the recommendation degree information updating unit 108 adds 10 points to the initial points.

A function related to viewing reservation indicates a function of making a viewing reservation for a program. For the function related to viewing reservation, the necessary condition for adding points to the recommendation points is that the user is using a program description function. For the function related to viewing reservation, the initial points are initially 25 points. Then, when the user uses an electronic program guide or a program guide for a program being currently broadcast, the recommendation degree information updating unit 108 adds 20 points to the initial points. Timing at which the function related to viewing reservation is recommended is determined at the time when the recommendation display instructing unit 132 obtains information indicating that the user returns to a program viewing state from a state in which the user is seeing program description, or information indicating that a program that the user sees in program description and actually watches ends. In this case, the recommendation display instructing unit 132 transmits an instruction signal to the display control unit 116. In addition, for the function related to viewing reservation, when the user sees program description, the recommendation degree information updating unit 108 adds 10 points to the initial points. In addition, for the function related to viewing reservation, when the user watches the same program as last week, the recommendation degree information updating unit 108 adds 10 points to the initial points. In addition, for the function related to viewing reservation, when the user uses a recording reservation function, the recommendation degree information updating unit 108 subtracts 100 points from the initial points. The point subtraction is performed because since the user who can use the recording reservation function can also use the viewing reservation function, it is determined that there is almost no need to recommend the viewing reservation function.

A function related to date setting (viewing reservation) indicates a function of setting date when a viewing reservation is made. For the function related to date setting (viewing reservation), the necessary condition for adding points to the recommendation points is that the user is using a viewing reservation function. For the function related to date setting (viewing reservation), the initial points are initially 20 points. Then, when the user watches the same program as last week, the recommendation degree information updating unit 108 adds 20 points to the initial points. Timing at which the function related to date setting (viewing reservation) is recommended is determined at the time when the recommendation display instructing unit 132 obtains information indicating that the user makes a viewing reservation for the same program a plurality of times. In this case, the recommendation display instructing unit 132 transmits an instruction signal to the display control unit 116. Here, the plurality of times indicates at least twice and is a predetermined number of times set in advance in the storage unit 112.

A function related to recording reservation indicates a function of making a recording reservation for a program. For the function related to recording reservation, the necessary condition for adding points to the recommendation points is that the user has program description of a program to be recorded and an appropriate device for recording. For the function related to recording reservation, the initial points are initially 25 points. Then, when the user uses one touch recording, the recommendation degree information updating unit 108 adds 20 points to the initial points. The one touch recording indicates a function that allows the user to record only by pressing a certain button while viewing video. Timing at which the function related to recording reservation is recommended is determined at the time when the recommendation display instructing unit 132 obtains from the storage unit 112 information indicating that a channel set by the user is between programs, and the recommendation display instructing unit 132 transmits an instruction signal to the display control unit 116. In addition, for the function related to recording reservation, when the user uses an electronic program guide or a program guide for a program being currently broadcast, the recommendation degree information updating unit 108 adds 20 points to the initial points. In addition, for the function related to recording reservation, when the user sees program description of a program to be recorded, the recommendation degree information updating unit 108 adds 10 points to the initial points. In addition, for the function related to recording reservation, when the user records the same program as last week, the recommendation degree information updating unit 108 adds 10 points to the initial points. Furthermore, for the function related to recording reservation, when the user uses a viewing reservation function, the recommendation degree information updating unit 108 subtracts 100 points from the initial points. The point subtraction is performed because since the user who can use the viewing reservation function can also use the recording reservation function, it is determined that there is almost no need to recommend the recording reservation function.

A function related to date setting (recording reservation) indicates a function of setting date when a recording reservation is made. For the function related to date setting (recording reservation), the necessary condition for adding points to the recommendation points is that the user makes a recording reservation. For the function related to date setting (recording reservation), the initial point is initially 0 point. Then, when the user records the same program as last week, the recommendation degree information updating unit 108 adds 20 points to the initial points. Timing at which the function related to date setting (recording reservation) is recommended is determined at the time when the recommendation display instructing unit 132 obtains information indicating that a channel set by the user is between programs, and the recommendation display instructing unit 132 transmits an instruction signal to the display control unit 116.

A function related to viewing trend display indicates a function of providing display to those programs in a program guide that are likely to be liked by the user based on a user's viewing trend. For the function related to viewing trend display, the initial point is initially 0 point. Then, when the user uses a function recommendation function, the recommendation degree information updating unit 108 adds 30 points to the initial points. Timing at which the function related to viewing trend display is recommended is determined at the time when the recommendation display instructing unit 132 obtains information indicating that a channel set by the user is between programs, and the recommendation display instructing unit 132 transmits an instruction signal to the display control unit 116.

A function related to brightness adjustment indicates a function of automatically adjusting the brightness of a screen in accordance with the brightness of a user's room, etc. For the function related to brightness adjustment, the initial point is initially 0 point. Then, when the user uses other eco-functions, the recommendation degree information updating unit 108 adds 30 points to the initial points. The other eco-functions include, for example, various power-saving modes. In addition, for the function related to brightness adjustment, when an image quality adjustment function is used, the recommendation degree information updating unit 108 adds 20 points to the initial points. Timing at which the function related to brightness adjustment is recommended is determined at the time when the recommendation display instructing unit 132 obtains information indicating that a channel set by the user is between programs, and the recommendation display instructing unit 132 transmits an instruction signal to the display control unit 116.

A function related to power consumption level display indicates a function of displaying a guide indicating how much power is being saved currently on the information processing apparatus 100. For the function related to power consumption level display, the initial point is initially 0 point. Then, when the user uses other eco-functions, the recommendation degree information updating unit 108 adds 30 points to the initial points. Timing at which the function related to power consumption level display is recommended is determined at the time when the recommendation display instructing unit 132 obtains from the storage unit 112 information indicating that a channel set by the user is between programs, and the recommendation display instructing unit 132 transmits an instruction signal to the display control unit 116.

A function related to no-operation power-off indicates a function of automatically placing the information processing apparatus 100 in a standby state when a predetermined period of time has elapsed after last operation is made on the information processing apparatus 100. For the function related to no-operation power-off, the initial point is initially 0 point. Then, when the user uses other eco-functions, the recommendation degree information updating unit 108 adds 30 points to the initial points. Timing at which the function related to no-operation power-off is recommended is determined at the time when the recommendation display instructing unit 132 obtains information indicating that a channel set by the user is between programs, and the recommendation display instructing unit 132 transmits an instruction signal to the display control unit 116.

A function related to video playback indicates a function of playing back a video recorder used with the information processing apparatus 100. For the function related to video playback, the initial point is initially 0 point. Then, when the user is able to obtain a plan such as travel or anniversary and records the plan in the storage unit 112, the recommendation degree information updating unit 108 adds 30 points to the initial points. In addition, for the function related to video playback, when the user is able to obtain an item such as a digital video camera or a digital camera and records information about the obtainment in the storage unit 112, the recommendation degree information updating unit 108 adds 20 points to the initial points. In addition, for the function related to video playback, when the user views travel programs a plurality of times, the recommendation degree information updating unit 108 adds 20 points to the initial points. In addition, for the function related to video playback, when other media system's playback functions are used, the recommendation degree information updating unit 108 adds 20 points to the initial points. Timing at which the function related to video playback is recommended is determined at the time when the recommendation display instructing unit 132 obtains information indicating that a channel set by the user is between programs, and the recommendation display instructing unit 132 transmits an instruction signal to the display control unit 116.

A function related to photo playback indicates a function of reproducing content data on photos on the information processing apparatus 100. For the function related to photo playback, the initial point is initially 0 point. Then, when the user uses an image quality adjustment function, the recommendation degree information updating unit 108 adds 20 points to the initial points. In addition, for the function related to photo playback, when the user is able to obtain a plan such as travel or anniversary and records the plan in the storage unit 112, the recommendation degree information updating unit 108 adds 30 points to the initial points. In addition, for the function related to photo playback, when the user is able to obtain an item such as a USB memory or a digital camera and records information about the obtainment in the storage unit 112, the recommendation degree information updating unit 108 adds 30 points to the initial points. In addition, for the function related to photo playback, when the user views travel programs a plurality of times, the recommendation degree information updating unit 108 adds 20 points to the initial points. In addition, for the function related to photo playback, when other media system's playback functions are used, the recommendation degree information updating unit 108 adds 20 points to the initial points. Timing at which the function related to photo playback is recommended is determined at the time when the recommendation display instructing unit 132 obtains information indicating that a channel set by the user is between programs, and the recommendation display instructing unit 132 transmits an instruction signal to the display control unit 116.

A function related to music playback indicates a function of reproducing content data on music on the information processing apparatus 100. For the function related to music playback, the initial point is initially 0 point. Then, when the user is able to obtain an item such as a USB memory, a PC, or a portable music player and records information about the obtainment in the storage unit 112, the recommendation degree information updating unit 108 adds 30 points to the initial points. In addition, for the function related to music playback, when the user views music programs a plurality of times, the recommendation degree information updating unit 108 adds 20 points to the initial points. In addition, for the function related to music playback, when the user uses other media system's playback functions, the recommendation degree information updating unit 108 adds 20 points to the initial points. Timing at which the function related to music playback is recommended is determined at the time when the recommendation display instructing unit 132 obtains information indicating that a channel set by the user is between programs, and the recommendation display instructing unit 132 transmits an instruction signal to the display control unit 116. The plurality of times indicates at least twice and may be three times or more.

A function related to a one touch mute key indicates a function of turning on power from a standby state only by pressing a mute key on the remote control. For the function related to a one touch mute key, the initial point is initially 0 point. Then, when the user uses the mute key a plurality of times, the recommendation degree information updating unit 108 adds 30 points to the initial points. Timing at which the function related to a one touch mute key is recommended is determined at the time when the recommendation display instructing unit 132 obtains information indicating that a channel set by the user is between programs, and the recommendation display instructing unit 132 transmits an instruction signal to the display control unit 116.

A function related to a one touch channel key indicates a function of turning on power from a standby state to display a program for a channel the user wants to view, only by pressing a channel key for the channel the user wants to view. For the function related to a one touch channel key, the initial point is initially 0 point. Then, when the user turns on the power to the information processing apparatus 100 and then switches between channels a plurality of times, the recommendation degree information updating unit 108 adds 30 points to the initial points. Timing at which the function related to a one touch channel key is recommended is determined at the time when the recommendation display instructing unit 132 obtains from the storage unit 112 information indicating that a channel set by the user is between programs, and the recommendation display instructing unit 132 transmits an instruction signal to the display control unit 116. The plurality of times indicates at least twice and may be three times or more.

A function related to clock display indicates a function of providing clock display on a display screen. For the function related to clock display, the initial point is initially 0 point. Then, when the user receives a digital terrestrial broadcast for the first time on the information processing apparatus 100, the recommendation degree information updating unit 108 adds 20 points to the initial points. Timing at which the function related to clock display is recommended is determined at the time when the recommendation display instructing unit 132 obtains information indicating that a channel set by the user is between programs, and the recommendation display instructing unit 132 transmits an instruction signal to the display control unit 116.

A function related to an external device link indicates a function of linking external devices. For the function related to an external device link, the initial point is initially 0 point. For the function related to an external device link, the necessary condition for adding points to the recommendation points is that the information processing apparatus 100 is connected to an external device. Then, when the user is able to obtain an item such as a PC or a digital camera and records information about the obtainment in the storage unit 112, the recommendation degree information updating unit 108 adds 30 points to the initial points. Timing at which the function related to an external device link is recommended is determined at the time when the recommendation display instructing unit 132 obtains information indicating that a channel set by the user is between programs, and the recommendation display instructing unit 132 transmits an instruction signal to the display control unit 116.

A function related to a sleep timer indicates a function of automatically turning off the power to the information processing apparatus 100 after a lapse of a predetermined period of time. For the function related to a sleep timer, the initial point is initially 0 point. Then, when the user uses an on-timer function a plurality of times on the information processing apparatus 100, the recommendation degree information updating unit 108 adds 20 points to the initial points. Timing at which the function related to a sleep timer is recommended is determined at the time when the recommendation display instructing unit 132 obtains from the storage unit 112 information indicating that a channel set by the user is between programs, and the recommendation display instructing unit 132 transmits an instruction signal to the display control unit 116. The plurality of times indicates at least twice and may be three times or more.

A function related to an on-timer indicates a function of automatically turning on the power to the information processing apparatus 100 after a lapse of a predetermined period of time. For the function related to an on-timer, the initial point is initially 0 point. Then, when the user uses a sleep timer function a plurality of times on the information processing apparatus 100, the recommendation degree information updating unit 108 adds 20 points to the initial points. In addition, for the function related to an on-timer, when the power is turned on in a close time zone, the recommendation degree information updating unit 108 adds 30 points to the initial points. The close time zone as used herein indicates a time zone that is within a range of a predetermined amount of time from time at which the recommended function determining unit 114 determines to make a recommendation. Timing at which the function related to an on-timer is recommended is determined at the time when the recommendation display instructing unit 132 obtains information indicating that a channel set by the user is between programs, and the recommendation display instructing unit 132 transmits an instruction signal to the display control unit 116. The plurality of times indicates at least twice and may be three times or more.

A function related to Internet services indicates a function of being able to display Internet information on part or the entire display screen. For the function related to Internet services, the initial point is initially 0 point. Then, when the user uses other Internet-based functions on the information processing apparatus 100, the recommendation degree information updating unit 108 adds 30 points to the initial points. The other Internet-based functions indicate Internet-based functions different from a target Internet-based function. In addition, for the function related to Internet services, when a time display function is used, the recommendation degree information updating unit 108 adds 10 points to the initial points. In addition, for the function related to Internet services, when a video playback function is used, the recommendation degree information updating unit 108 adds 20 points to the initial points. Timing at which the function related to Internet services is recommended is determined at the time when the recommendation display instructing unit 132 obtains information indicating that a channel set by the user is between programs, and the recommendation display instructing unit 132 transmits an instruction signal to the display control unit 116.

A function related to two-screen display indicates a function of displaying two programs, etc., on a display screen of the information processing apparatus 100. For the function related to two-screen display, the initial point is initially 0 point. Then, when the user performs zapping a plurality of times on the information processing apparatus 100, the recommendation degree information updating unit 108 adds 20 points to the initial points. Timing at which the function related to two-screen display is recommended is determined at the time when the recommendation display instructing unit 132 obtains from the storage unit 112 information indicating that a channel set by the user is between programs, and the recommendation display instructing unit 132 transmits an instruction signal to the display control unit 116.

Note that for those functions that are recommended once, the recommendation degree information updating unit 108 can subtract points from recommendation degrees of the functions. For each function, the points to be subtracted by the recommendation degree information updating unit 108 may be equal to or more than the initial points of the function or may be twice or three times the initial points. Alternatively, the points to be subtracted may be, for example, one-half or one-third of the initial points.

(3-2. Regarding Flow of a Function Recommendation Method)

Of the above-described four-step process, i.e., (1) updating a knowledge base, (2) deciding on a recommendation, (3) making a recommendation, and (4) adjusting a recommended function standard, (1) updating a knowledge base is described above. Next, (2) deciding on a recommendation, (3) making a recommendation, and (4) adjusting a recommended function standard will be described with reference to FIG. 10.

FIG. 10 is an illustrative diagram of the flow of a function recommendation method by the information processing apparatus 100. First, when a user operation 128 is performed, the recommendation degree information updating unit 108 adds points to recommendation points of a predetermined function based on the operation 128 (S200 and S201). For example, referring to the above-described table 1, when the user receives a digital terrestrial broadcast for the first time, the recommendation degree information updating unit 108 adds 30 points to recommendation points of the function of using an electronic program guide. The recommendation points are an example of the recommendation degree.

Then, the recommended function determining unit 114 checks a recommendation Lv (S202). For example, when the recommendation status is 1 to 10 and the function usage rate is 0 to 10%, the recommendation standard adjusting unit 120 sets the recommendation Lv to 1. When the recommendation status is 11 to 20 and the function usage rate is 11 to 20%, the recommendation standard adjusting unit 120 sets the recommendation Lv to 2. Here, the recommendation Lv is an example of the recommended function standard. The recommendation status is, though described later, an example of the number of executions of a recommended function. The number of executions of a recommended function indicates the number of times the user has manipulated the recommended function. That is, the recommendation status is a parameter whose value increases when the user uses a function recommended by the recommended function determining unit 114. The function usage rate is, though described later, a parameter determined by the function usage rate calculating unit 126 calculating the number of functions manipulated by the user with respect to the number of all functions recorded in the storage unit 112.

Then, the recommended function determining unit 114 decides, for a certain function, on what the recommendation Lv is (S204). If the recommendation Lv is 1 to 3, then the recommended function determining unit 114 can select a function from basic functions and determine the selected function as a function to be recommended. The basic functions as used herein include, for example, functions provided to the information processing apparatus 100. If the recommendation Lv is 4 to 6, then the recommended function determining unit 114 can select a function from the basic functions and some predetermined functions other than the basic functions and determine the selected function as a function to be recommended. The some predetermined functions other than the basic functions as used herein include, for example, functions of an apparatus used with the information processing apparatus 100. The apparatus used with the information processing apparatus 100 includes, for example, a recorder when the information processing apparatus 100 is a television receiver. If the recommendation Lv is 7 to 10, then the recommended function determining unit 114 can select a function from all functions recorded in the storage unit 112 and determine the selected function as a function to be recommended. In this manner, the number of functions recommended by the recommended function determining unit 114 fluctuates according to the recommendation Lv. For example, the number of functions recommended to the user may increase in accordance with an increase in recommendation Lv. By this, the user can get a feeling as if the information processing apparatus 100 is growing up and thus can accordingly get a sense of attachment to the information processing apparatus 100. Further, the recommendation timing determining unit 136 may determine timing at which a recommendation is made to the user, in accordance with an increase in recommendation Lv. Specifically, the recommendation timing determining unit 136 can determine timing at which the display control unit 116 causes the display apparatus 118 to provide recommendation display, according to the recommendation Lv. That is, the timing can be shortened according to the recommendation Lv. Hence, not only by the number of functions recommended but also by timing at which a recommendation is made, the user can get a feeling as if the information processing apparatus 100 is growing up and thus can accordingly get a sense of attachment to the information processing apparatus 100.

Then, if the recommended function determining unit 114 decides that there is a function to be recommended to the user (YES at S212), then the recommended function determining unit 114 decides on whether there are a plurality of functions to be recommended (S214). If there are a plurality of functions to be recommended, then the recommended function determining unit 114 selects one function with high recommendation points and determines the selected function as a function to be recommended (S216 and S218). The recommendation points are an example of the recommendation degree. The recommendation degree indicates a reference for outputting, on a priority basis, display for recommending use of a function to the display apparatus 118, and is calculated by the recommendation degree information updating unit 108 causing the recommendation degree to fluctuate. On the other hand, if there is only one function to be recommended, then the recommended function determining unit 114 determines the function, as a function to be recommended (S218).

In the storage unit 112, trigger information, which indicates content of a user operation which serves as a trigger to cause the display apparatus 118 to provide recommendation display, is further stored so as to be associated with the function attribute information. When a user operation that matches a user operation associated with the trigger information is input, the recommendation display instructing unit 132 generates an instruction signal which is a signal for allowing the display control unit 116 to perform control of the display apparatus 118, and outputs the instruction signal to the display control unit 116. In response to the input of the instruction signal output from the recommendation display instructing unit 132, the display control unit 116 can cause the display apparatus 118 to provide the recommendation display (S218).

Then, the display control unit 116 causes the display apparatus 118 to output recommendation display for the recommended function. The user can determine whether to use the recommended function by, for example, viewing the recommendation display for the recommended function (S220). If the user uses the function, then the number-of-executions-of-recommended-function calculating unit 124 can update the recommendation status (S224). For example, when the user uses the function, the number-of-executions-of-recommended-function calculating unit 124 can increase the value of the recommendation status by one.

Further, the function usage rate calculating unit 126 can update the function usage rate. For example, it is assumed that the number of all functions recorded in the storage unit 112 is 65 and the user has used 33 functions so far. Then, when the user uses a recommended function for the first time, the number of functions having been used by the user becomes 34, which makes the function usage rate 34/65. Accordingly, the function usage rate calculating unit 126 calculates the function usage rate to be about 52%.

Further, if the user uses the recommended function, then the recommendation degree information updating unit 108 can update the recommendation points (S228). Specifically, when a function manipulated by the user matches a function determined by the recommended function determining unit 114 and recommended to the user, a predetermined value can be subtracted from recommendation points of the function. For example, in FIGS. 7 to 9, when the recommended function determining unit 114 recommends the function of using an electronic program guide and the user uses the electronic program guide, the recommendation degree information updating unit 108 can subtract 100 points from recommendation points of the function.

On the other hand, even when the user does not use the recommended function, the recommendation degree information updating unit 108 can update the recommendation points (S222). Specifically, even when a function manipulated by the user does not match a function determined by the recommended function determining unit 114 at the latest timing and recommended to the user, recommendation points of the function can be updated. For example, in FIGS. 7 to 9, when the recommended function determining unit 114 recommends the function of using an electronic program guide but the user uses a function different from the recommended function, the recommendation degree information updating unit 108 can subtract 200 points from recommendation points of the function. In this case, the recommendation degree information updating unit 108 can perform higher point subtraction than 100-point subtraction performed when the user uses an electronic program guide. Such point subtraction is performed to reflect the fact that the user does not like the function. By subtracting higher points when the user does not use a recommended function than when the user uses the recommended function, the function is less likely to be recommended next time after the function is recommended once.

As described above, the number-of-recommended-functions determining unit 134 can cause the number of functions to be recommended to fluctuate according to the recommendation Lv. Further, the recommendation timing determining unit 136 may adjust timing at which a recommendation is made, according to the recommendation Lv. The timing at which a recommendation is made is, for example, when the user turns on power or when a predetermined user operation 128 is performed or when a program of a predetermined channel is viewed or when channels are zapped. As used herein, the zapping, i.e., a channel switching process, indicates that the user is switching between various channels in a short period of time.

For a method of informing the user of a function to be recommended, by the display control unit 116 providing recommendation display on the display apparatus 118, there are a variety of methods. For example, there are a method in which the display control unit 116 displays on the display apparatus 118 a pop-up window indicating that there is a function to be recommended and a method in which function manipulation explanation data stored in the storage unit 112 is provided as an electronic manual and a function to be recommended is emphasized by providing a mark. A method of making a recommendation on the display apparatus 118 will be described later.

The information processing apparatus 100 according to the present embodiment may recommend an operation of a device in collaboration with Web services. Specifically, the external information obtaining unit 106 obtains information about a user's schedule through the server 102. Then, the information is recorded in the storage unit 112. Based on the information, the recommended function determining unit 114 determines to recommend a function at predetermined timing. For example, when "before the athletic meet" is set in a schedule service, the recommended function determining unit 114 can generate an output signal for an attention message saying "Is the battery of the video camera charged? Is there free memory space?" and display the message on a display screen.

(3-3. Regarding Application Examples of Recommendation Point Fluctuation Method)

Next, with reference to FIGS. 11 to 25, the flow of the above-described function recommendation method will be described in detail using specific examples. FIGS. 11 to 15 are each an illustrative diagram showing, in graph form, recommendation points of specific functions.

Figure 11:
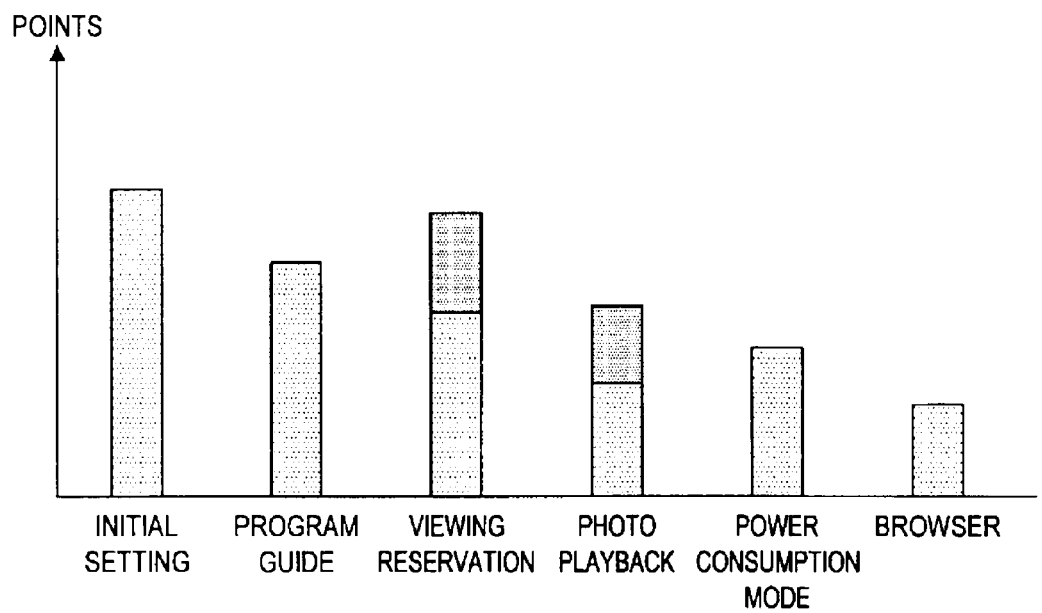
FIG. 11 is a diagram illustrating recommendation points of functions that can be recommended by the information processing apparatus according to the embodiment.

In FIG. 11, description is made using, as candidates for a function to be recommended, initial setting, program guide, viewing reservation, photo playback, power consumption mode, and browser. Description is made with the information processing apparatus 100 being a television receiver. That is, the initial setting indicates the use of an initial setting screen of the television receiver. The program guide indicates the use of a program guide displayed on the television receiver. The viewing reservation indicates a viewing reservation for a television program made on the television receiver. The power consumption mode indicates the use of the television receiver in a power saving mode. The browser indicates the use of a Web browser on the television receiver.

In FIG. 11, the recommendation points are high in order of initial setting, viewing reservation, program guide, photo playback, power consumption mode, and browser. Namely, the recommended function determining unit 114 can select and determine a function to be recommended in the above-described order. A portion of a bar graph with a different color in each of viewing reservation and photo playback indicates added recommendation points. That is, the portion corresponds to a recommendation degree whose value is increased by the recommendation degree information updating unit 108 along with a user operation.

Figure 12:
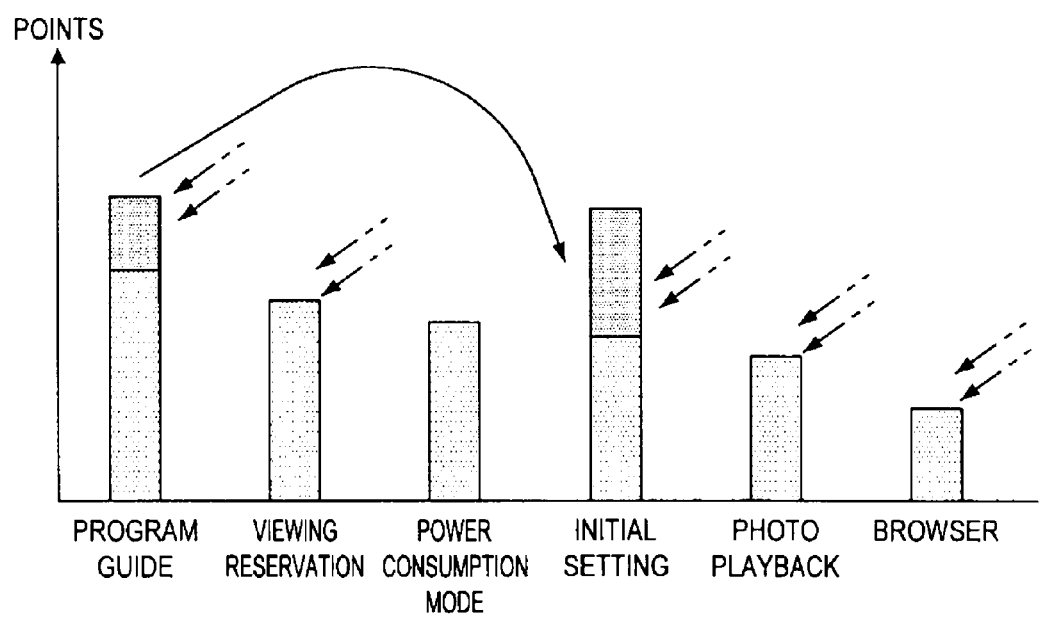
FIG. 12 is a diagram illustrating recommendation points of functions that can be recommended by the information processing apparatus according to the embodiment.
Figures 13, 14:
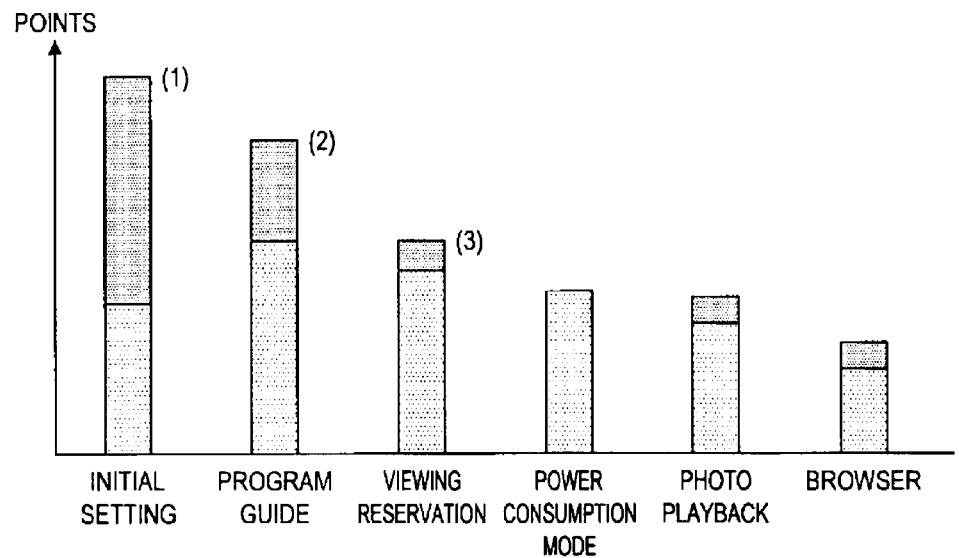
FIG. 13 is a diagram illustrating recommendation points of functions that can be recommended by the information processing apparatus according to the embodiment.
FIG. 14 is a diagram illustrating a relationship between functions that can be recommended by the information processing apparatus according to the embodiment.

Next, with reference to FIGS. 12, 13, and 14, fluctuations in recommendation points will be described. Specifically, a method of increasing the value of a recommendation degree by the recommendation degree information updating unit 108 will be described. FIG. 12 is an illustrative diagram showing, in graph form, recommendation points for the respective functions under certain conditions. Here, it is assumed that the user uses the viewing reservation function. In this case, in order for the user to use the viewing reservation function, the user uses a program guide before the use of the viewing reservation function. Further, in order for the user to use the program guide, the user uses the initial setting function before the use of the program guide. That is, as shown in FIG. 14, the user uses functions in order of the initial setting function (reference numeral 304), the program guide function (reference numeral 302), and the viewing reservation function (reference numeral 300). An example of such functions that are to be used in association with a predetermined function is shown in FIG. 14. Specifically, in vertical alignment, the function denoted by reference numeral 304 is used and the function denoted by reference numeral 302 is used and then the function denoted by reference numeral 300 is used. The recommendation degree information updating unit 108 causes recommendation degrees of the respective functions to fluctuate based on the function attribute information and the user operation 128. As a result, as shown in FIG. 13, by the user using the viewing reservation function, points are added to recommendation points of the initial setting, program guide, and viewing reservation functions. Further, function association information that allows points to be added to recommendation points of the photo playback and browser functions, as shown in FIG. 13, may be recorded in the storage unit 112. The recommended function determining unit 114 can select and determine a function to be selected, based on the recommendation points which are an example of the recommendation degree.

Figure 15:
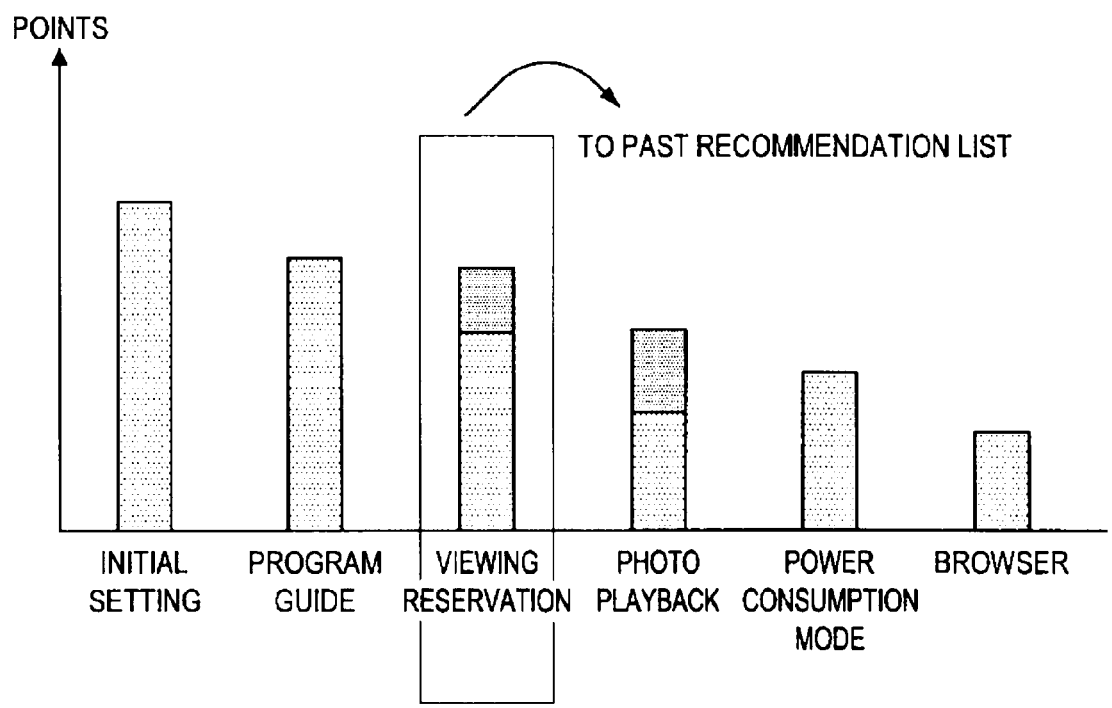
FIG. 15 is a diagram illustrating recommendation points of functions that can be recommended by the information processing apparatus according to the embodiment.

Next, with reference to FIG. 15, fluctuations in recommendation points after the recommended function determining unit 114 recommends a function will be described. Description is made assuming a case in which in FIG. 15 the recommendation points are high in order of the initial setting function and the program guide function but the recommended function determining unit 114 having obtained function recommendation timing information determines to recommend the viewing reservation function. In this case, the recommended function determining unit 114 determines the viewing reservation as a recommended function. After the display control unit 116 causes the display apparatus 118 to provide recommendation display for the viewing reservation, the recommendation degree information updating unit 108 can perform point subtraction on the viewing reservation function. For a method for the point subtraction, for example, the recommendation degree information updating unit 108 may perform point subtraction when a function manipulated by the user matches a function recommended to the user by the recommended function determining unit 114. The storage unit 112 may have a past recommendation list which is a list of functions recommended in the past, and the viewing reservation function may be recorded in the past recommendation list. By the information processing apparatus 100 recommending a function based on such an algorithm, those functions that are recommended once are less likely to be recommended and those functions that have not been used are recommended. As a result, the convenience of finding a function suitable for the user is improved. For the fluctuations in recommendation points, description has been made using, as an example, the functions of the information processing apparatus 100 but the present embodiment is not limited to such an example. Specifically, the information processing apparatus 100 can also recommend a function of an external device other than the information processing apparatus 100.

(3-4. Regarding Function Recommendation Display on Display Screen)

Next, with reference to FIGS. 16 to 25, function recommendation display on a display screen for when the information processing apparatus 100 is a television receiver will be described in detail. FIGS. 16 to 25 are each an illustrative diagram of function recommendation display to be provided on a display screen when the user is viewing a program.

Figure 16:
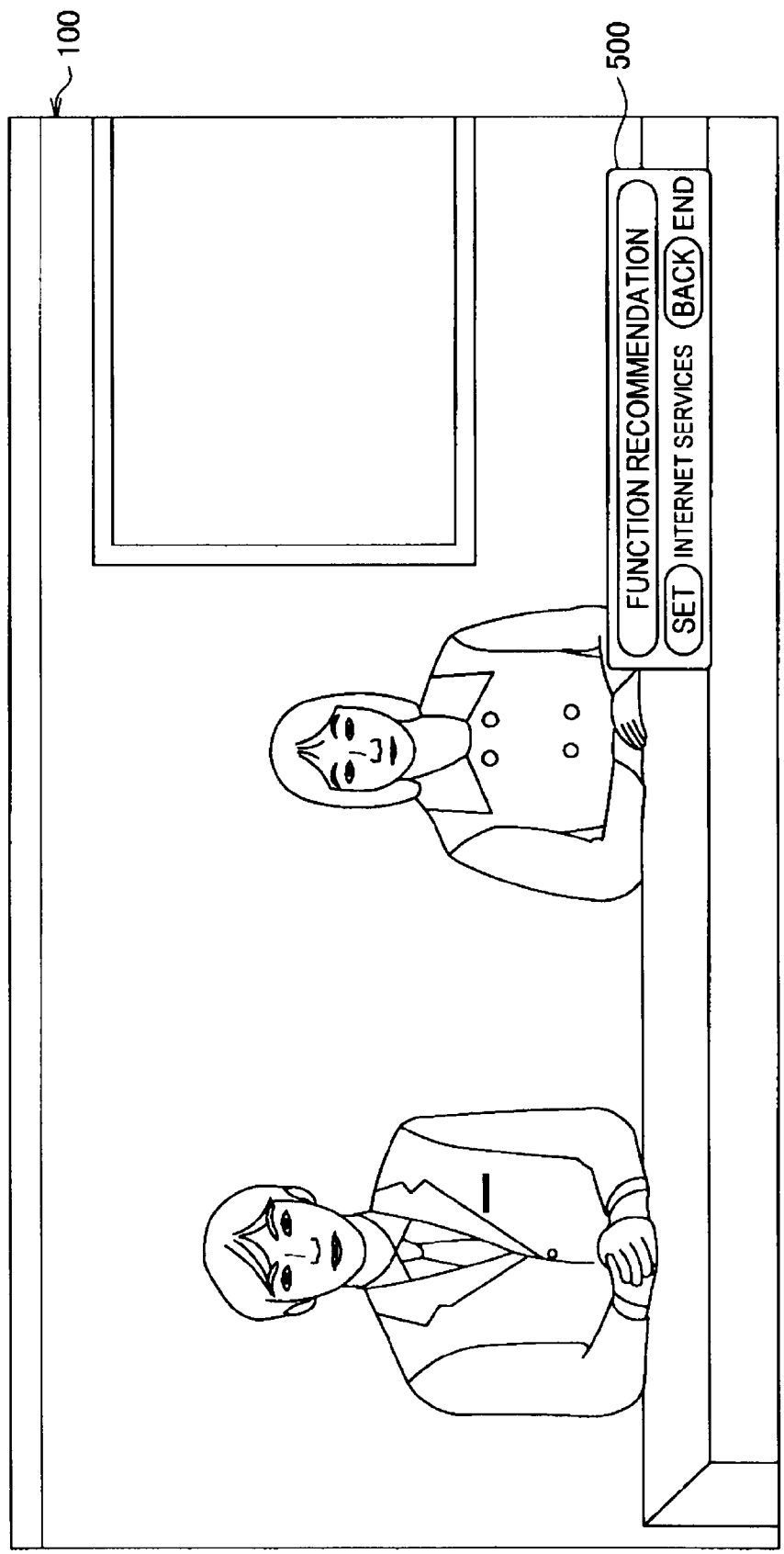
FIG. 16 is a diagram illustrating a display screen of the information processing apparatus according to the embodiment.
Figure 17:
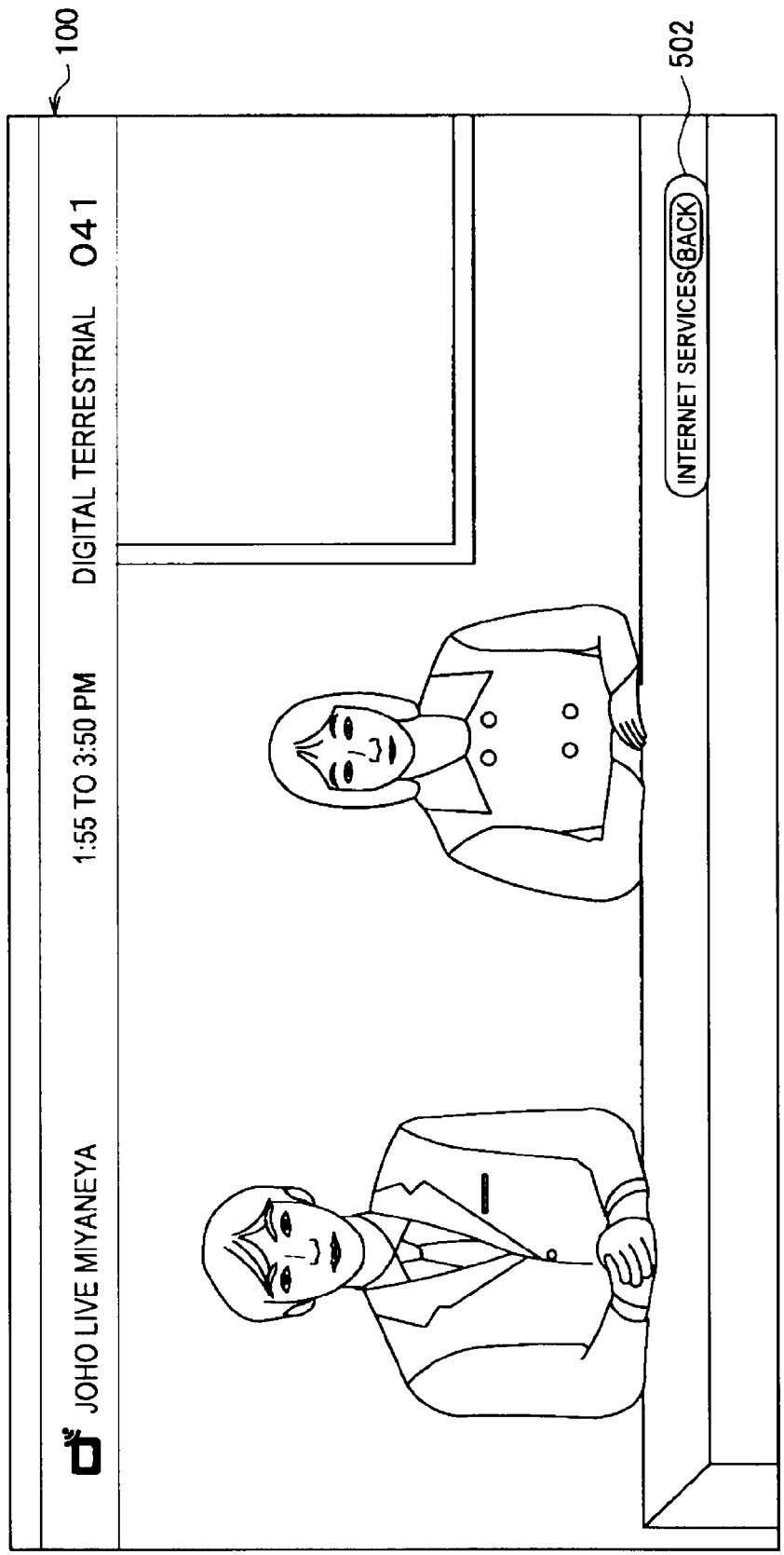
FIG. 17 is a diagram illustrating the display screen of the information processing apparatus according to the embodiment.

As shown in FIG. 16, the recommended function determining unit 114 determines a function to be recommenced, and a display 500 recommending the user to use a function is provided on a display screen of the information processing apparatus 100. For example, by the user pressing a set key on the remote control, the display control unit 116 can provide a next display screen. As shown in FIG. 17, the display control unit 116 can then provide a display 502. When there is no reaction from the user to such a display screen for a fixed period of time, i.e., when there is no user operation 128, the display control unit 116 may put off the display 500 (which may be the display 502) on the display screen. In such a case, since the user is considered to have no interest in function recommendation, the above-described display may be a nuisance to the user.

Figure 18:
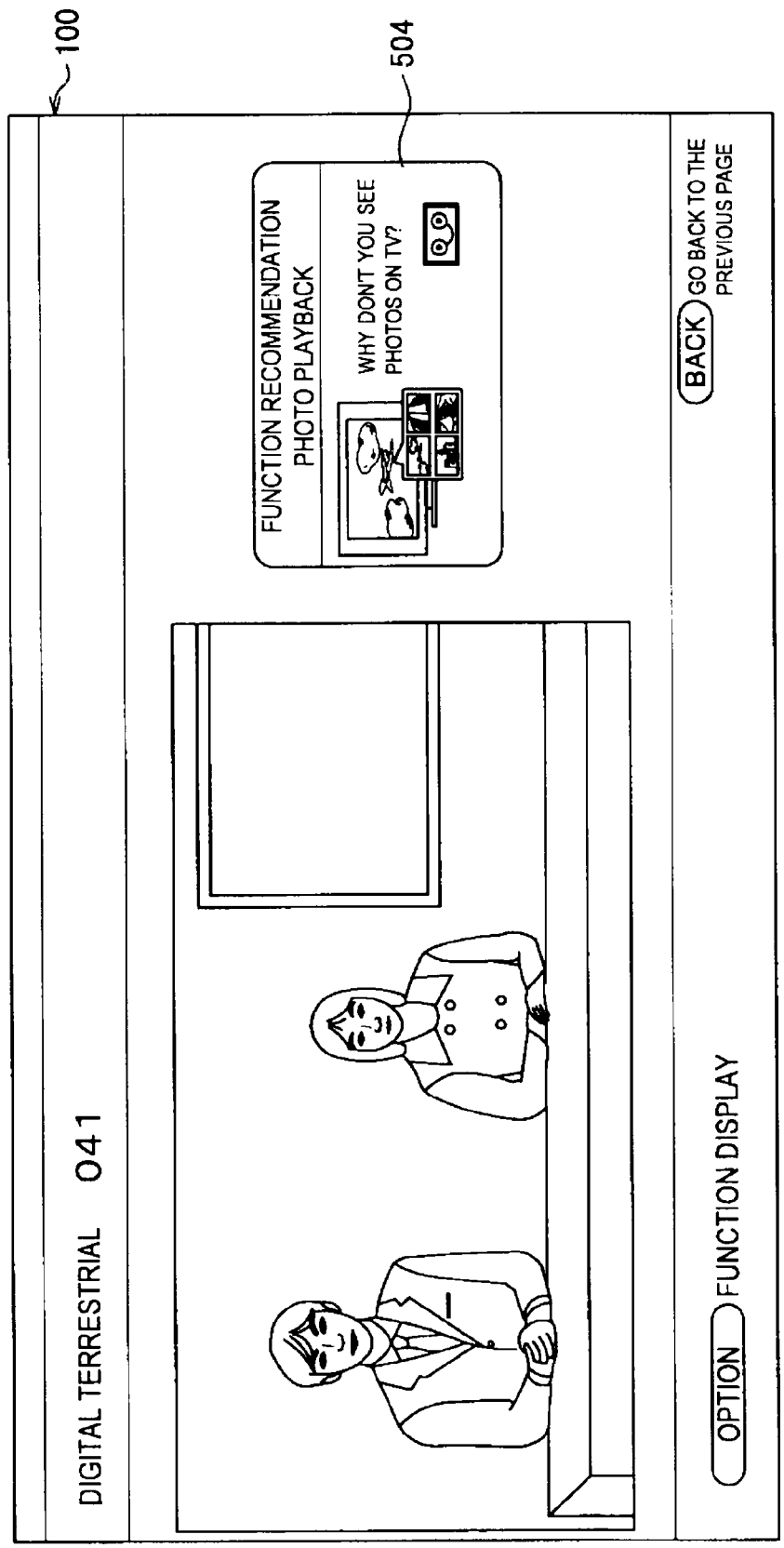
FIG. 18 is a diagram illustrating the display screen of the information processing apparatus according to the embodiment.

Then, as shown in FIG. 18, the display control unit 116 then provides a display 504 on a display screen. The recommended function determining unit 114 has selected and determined to recommend the photo playback function to the user and the display 504 is provided with a comment saying "Why don't you see photos on TV?". For example, by the user pressing the set key on the remote control, the display control unit 116 can provide the next display.

Figure 19:
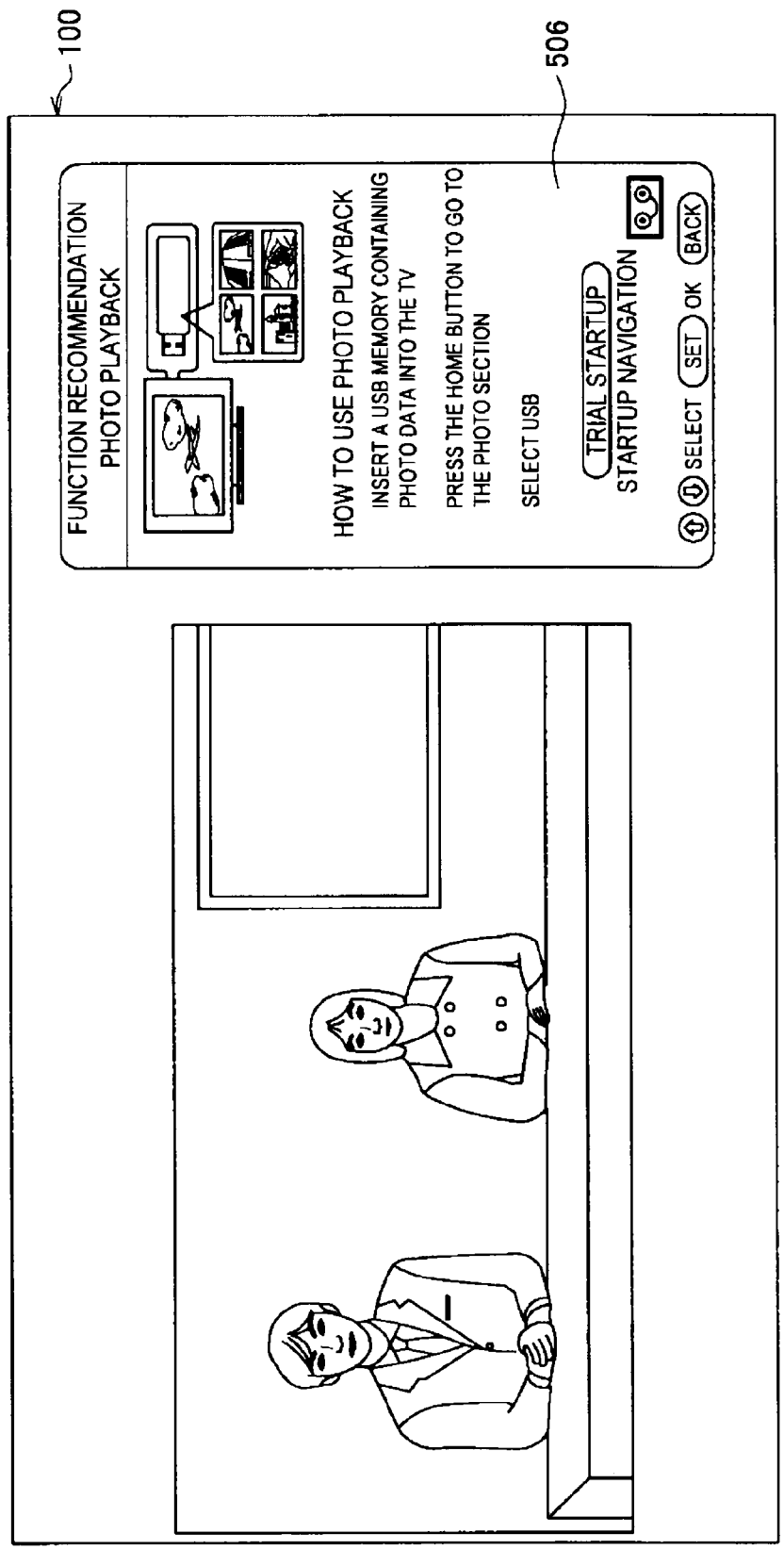
FIG. 19 is a diagram illustrating the display screen of the information processing apparatus according to the embodiment.
Figure 20:
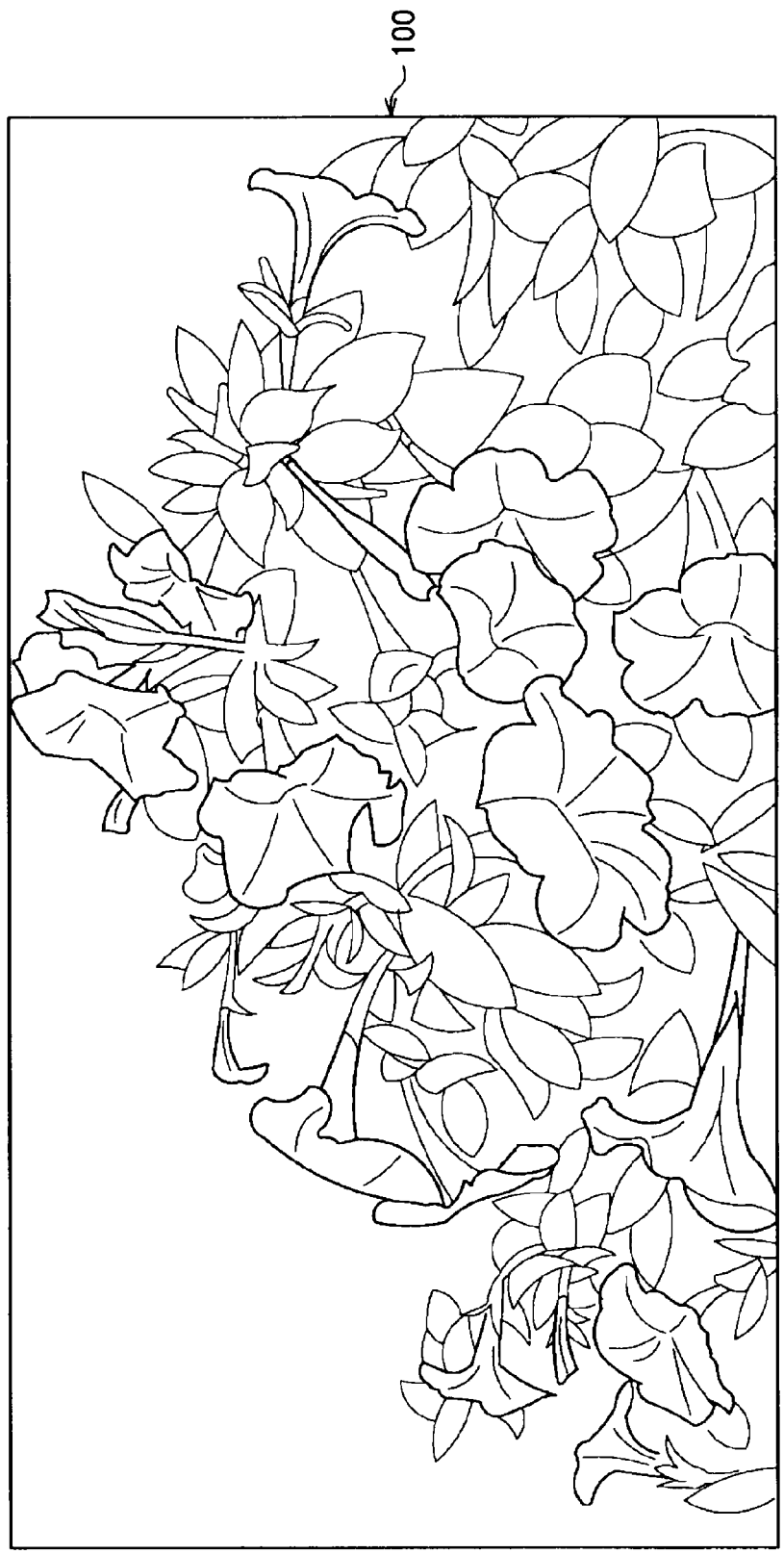
FIG. 20 is a diagram illustrating the display screen of the information processing apparatus according to the embodiment.

Then, as shown in FIG. 19, the display control unit 116 provides next display 506 on a display screen. The display 506 provides an explanation of how to use photo playback. First, a USB memory containing photo data is inserted into the TV. Then, a home button is pressed to go to the photo section. Then, USB is selected. A summary of such procedural steps is presented. Then, the user can select either "trial startup" or "startup navigation". The "trial startup" allows the user to use a function similar to the recommended function on a trial basis in a simplified manner before actually using the recommended function. The "startup navigation" allows the information processing apparatus 100 to provide navigation in order for the user to actually use the recommended function. The user can select either "trial startup" or "startup navigation" by pressing up and down keys on the remote control and then press the set key. For example, when the user selects the "trial startup" using the remote control, the display control unit 116 causes the display apparatus 118 to provide display such as that shown in FIG. 20. That is, since the user can view the function on a trial basis that is recommended by the recommended function determining unit 114, he/she can hold in advance an image of a result of use of the function.

Figure 21:
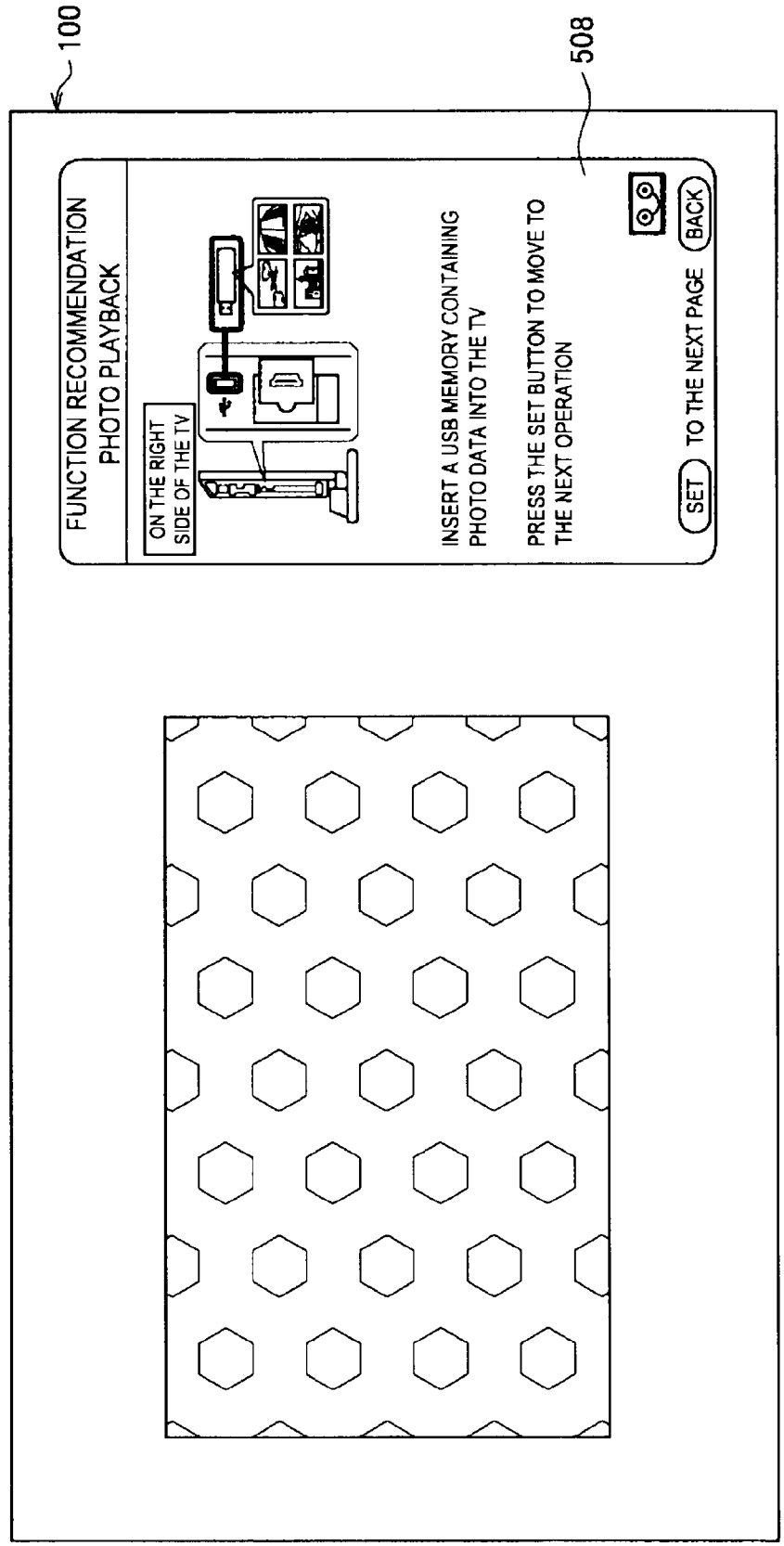
FIG. 21 is a diagram illustrating the display screen of the information processing apparatus according to the embodiment.

On the other hand, when the user selects the "startup navigation" using the remote control, as shown in FIG. 21, a display 508 is provided on a display screen. Specifically, though description will be made with reference to FIGS. 21 to 23, the display control unit 116 can display a method of using the function recommended to the user in order of use. For the method of using the function, function manipulation explanation data which is data on a manipulation explanation for each function is recorded in the storage unit 112 and the recommended function determining unit 114 can cause the display control unit 116 to provide display for the method of using the function, based on the function manipulation explanation data. As shown in FIG. 21, first, as a method of using the photo playback function, the display control unit 116 displays the explanation "Insert a USB memory containing photo data into the TV". In response to the explanation, the user can press the set key using the remote control. As a result, the display control unit 116 can provide next display. Further, the user can actually insert a USB memory into the information processing apparatus 100 in accordance with the explanation and use the recommended function while seeing the explanation display. Note that, as shown in the display 508, the explanation is not limited to that with words and the display control unit 116 can provide recommendation display including function manipulation explanation data having illustrations, etc. By adopting such a display form, the user can further speed up learning the above-described method of using the function.

Figure 22:
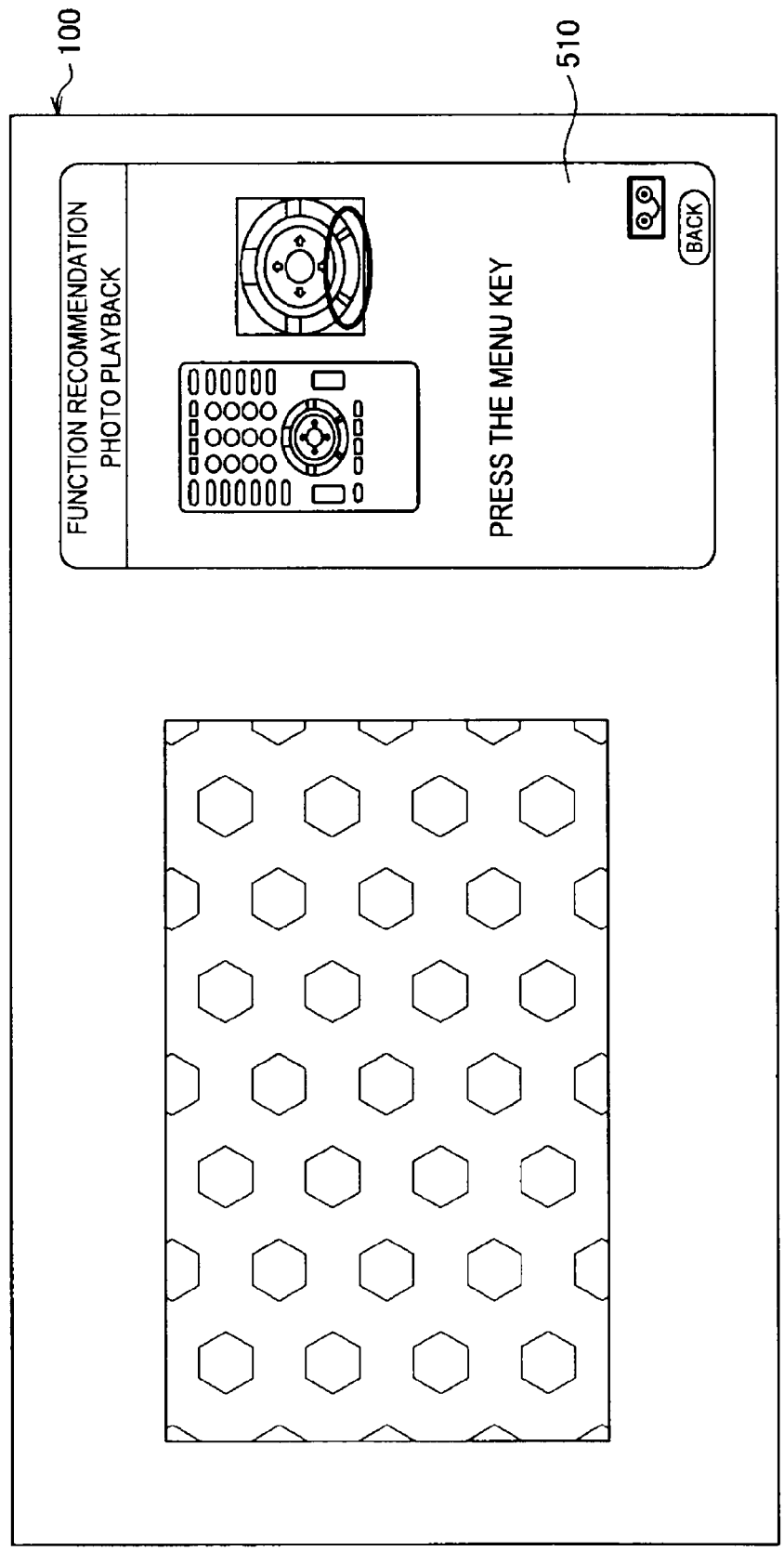
FIG. 22 is a diagram illustrating the display screen of the information processing apparatus according to the embodiment.

Then, as shown in FIG. 22, the display control unit 116 can provide a display 510 on a display screen. As a continuation of the above-described method of using the photo playback function, the display control unit 116 displays the explanation "Press the home button". In response to the explanation, the user can press a menu key using the remote control. As a result, the display control unit 116 may provide next display.

Figure 23:
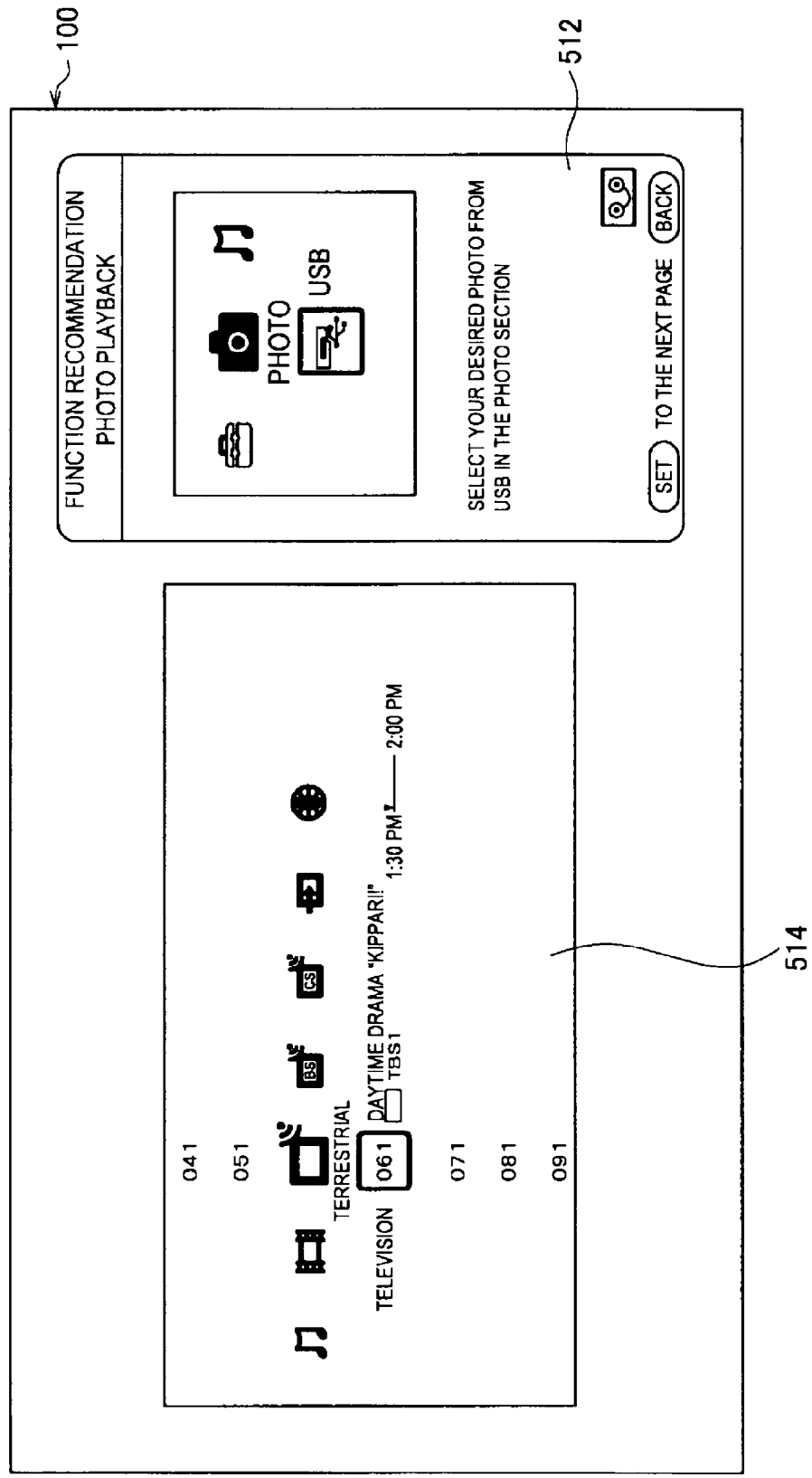
FIG. 23 is a diagram illustrating the display screen of the information processing apparatus according to the embodiment.

Then, as shown in FIG. 23, the display control unit 116 can provide a display 512 and a display 514 on a display screen. As a continuation of the above-described method of using the photo playback function, the display control unit 116 displays the explanation "Select your desired photo from USB in the photo section". The user can select a photo to be displayed on a display screen from photos recorded in the USB memory by pressing up, down, left, and right keys on the remote control to select the photo section on the display 514 and then pressing the set key. In this manner, the user can manipulate the recommended function while seeing the explanation. Therefore, learning of the method of using the function is speeded up and the chance of misoperation is reduced.

Next, with reference to FIGS. 24 and 25, display concerning an explanation of manipulation of a function recommended by the information processing apparatus 100 will be described. FIG. 24 is an illustrative diagram of an explanation of manipulation of functions displayed on a display screen of the information processing apparatus 100. As shown in FIG. 24, the recommended function determining unit 114 can display particularly which function the recommended function determining unit 114 can recommend in an explanation of functions on a display screen. For recommended functions, the recommended function determining unit 114 can provide display "recommended" and display "popular function" on the display screen. For the above-described displays, for example, based on recommendation degrees, the recommended function determining unit 114 can determine to provide display "recommended" to a function with the highest recommendation degree and can determine to provide display "popular function" to a function with the second highest recommendation degree. In this manner, the recommended function determining unit 114 can provide display such that function manipulation explanation data is included in recommendation degrees. Accordingly, the user can also grasp particularly which function is a popular function and which function is a recommended function, while seeing an explanation of functions.

Figure 25:
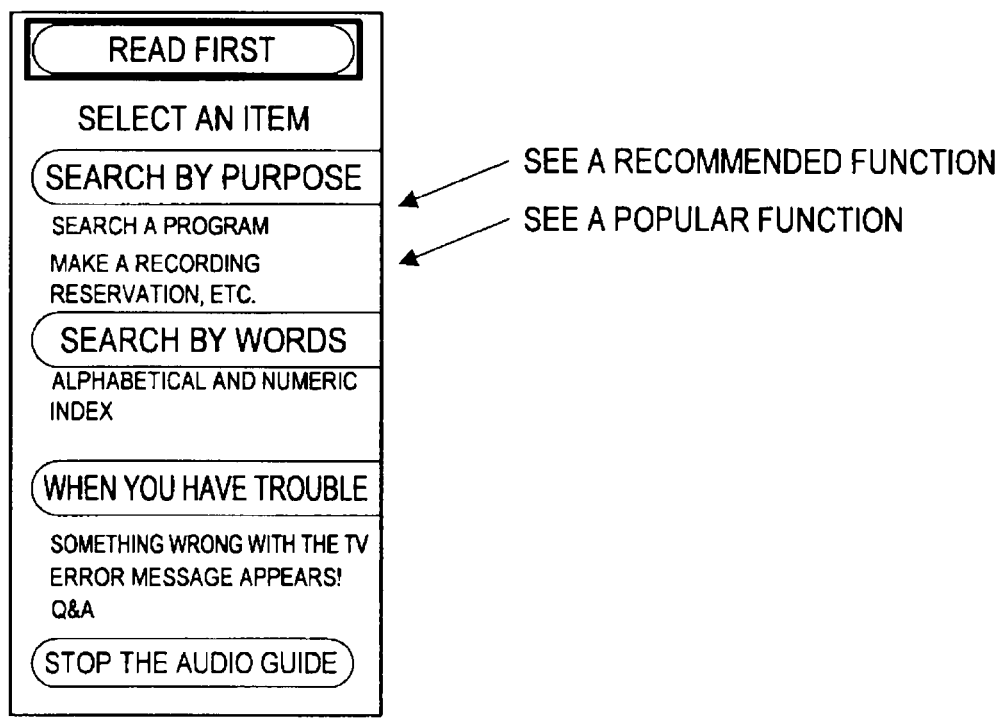
FIG. 25 is a diagram illustrating the display screen of the information processing apparatus according to the embodiment.

FIG. 25 is an illustrative diagram of a guide to an explanation of manipulation of a function displayed on a display screen of the information processing apparatus 100. The display control unit 116 may provide display "See a recommended function" and display "See a popular function" to guide display such as that shown in FIG. 25. By providing such displays, the user can easily grasp a function that is currently highly likely to be recommended. When the user selects the display "See a recommended function" using the remote control, for example, the display control unit 116 may display a bar chart such as that shown in FIG. 12, on a display screen.

<4. Hardware Configuration Example of Information Processing Apparatus 100>

Figure 26:
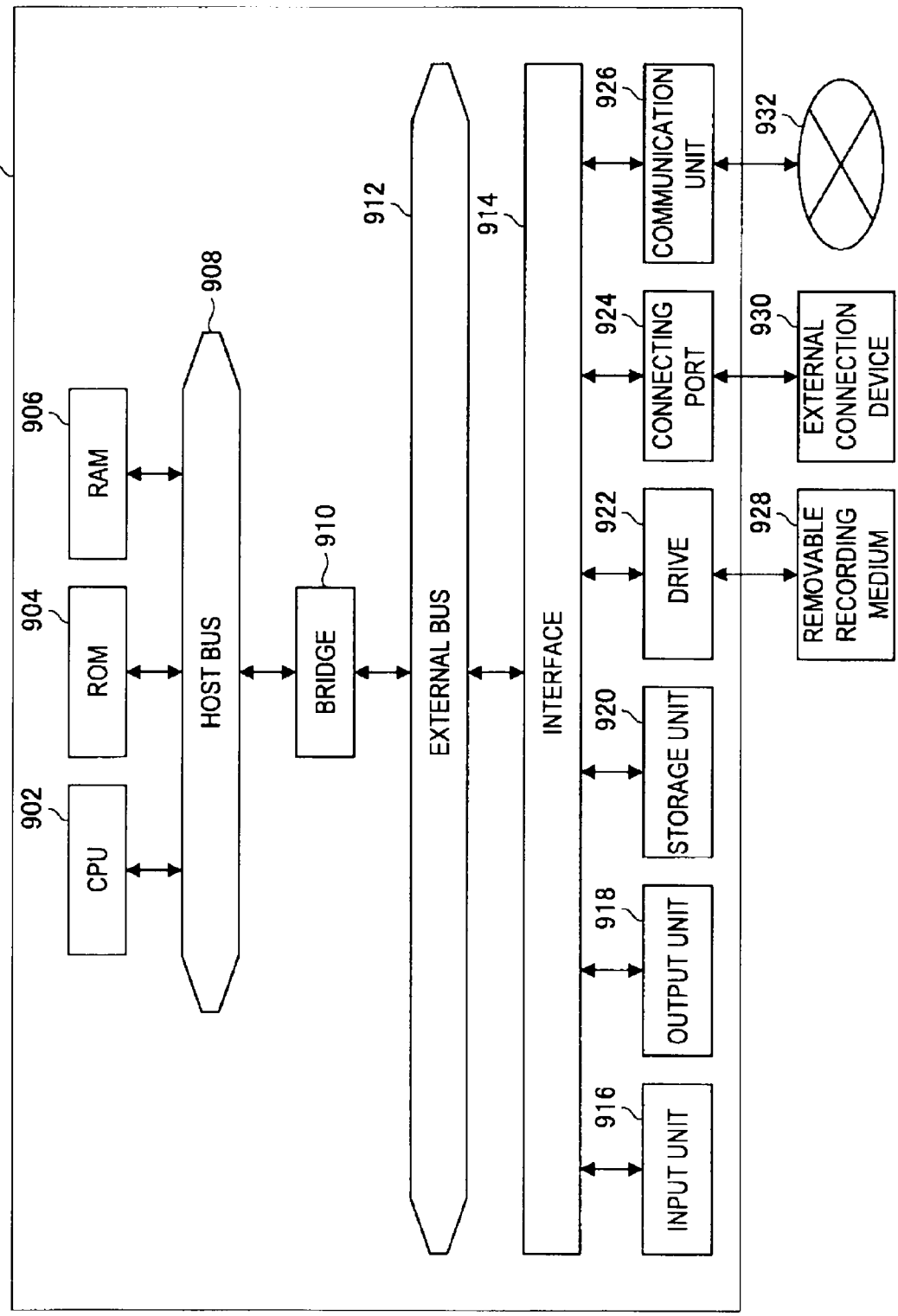
FIG. 26 is an illustrative diagram showing a hardware configuration example of the information processing apparatus according to the embodiment.

The functions of the respective components of the above-described apparatus can be achieved by, for example, an information processing apparatus having a hardware configuration shown in FIG. 26, using a computer program for achieving the functions. FIG. 26 is an illustrative diagram showing a hardware configuration of an information processing apparatus that can achieve the functions of the respective components of the above-described apparatus. The form of the information processing apparatus is any. For example, the form includes a personal computer, a portable information terminal such as a mobile phone, a PHS (Personal Handyphone System), or a PDA (Personal Digital Assistant), a game machine, and various information home appliances.

As shown in FIG. 26, the above-described information processing apparatus mainly includes a CPU (Central Processing Unit) 902 and a ROM (Read Only Memory) 904. In addition, the information processing apparatus includes a RAM (Random Access Memory) 906, a host bus 908, a bridge 910, an external bus 912, and an interface 914. Furthermore, the information processing apparatus includes an input unit 916, an output unit 918, a storage unit 920, a drive 922, a connecting port 924, and a communication unit 926.

The CPU 902 functions as, for example, an arithmetic processing apparatus or a control apparatus and controls all or some of the operations of the components based on various programs recorded in the ROM 904, the RAM 906, the storage unit 920, or a removable recording medium 928. The ROM 904 stores, for example, a program to be loaded into the CPU 902 and data used for a computation. The RAM 906 temporarily or permanently stores, for example, a program to be loaded into the CPU 902 and various parameters that appropriately change when the program is executed. These components are interconnected, for example, via the host bus 908 which enables high-speed data transmission. The host bus 908 is, for example, connected to the external bus 912 with a relatively low data transmission rate via the bridge 910.

The input unit 916 is an operation means, e.g., a mouse, a keyboard, a touch panel, a button, a switch, a lever, etc. The input unit 916 may be a remote control means (so-called remote control) that can transmit control signals using infrared rays or other radio waves. Note that the input unit 916 is configured by an input control circuit, etc., for transmitting information input using the operation means, to the CPU 902 as an input signal.

The output unit 918 includes, for example, a display apparatus such as a CRT (Cathode Ray Tube) or an LCD (Liquid Crystal Display). In addition, the output unit 918 includes, for example, a display apparatus such as a PDP (Plasma Display Panel) or an ELD (Electro-Luminescence Display). In addition, the output unit 918 is an apparatus that can visually or auditorily provide notification of obtained information to a user, such as an audio output apparatus such as a speaker or headphones, a printer, a mobile phone, or a facsimile.

The storage unit 920 is an apparatus for storing various data and is configured by, for example, a magnetic storage device such as a Hard Disk Drive (HDD), a semiconductor storage device, an optical storage device, or a magneto-optical storage device.

The drive 922 is an apparatus that reads information recorded in the removable recording medium 928, e.g., a magnetic disk, an optical disk, a magneto-optical disk, a semiconductor memory, etc., or writes information to the removable recording medium 928. The removable recording medium 928 is, for example, a DVD medium, a Blu-ray medium, an HD-DVD medium, a memory stick, or an SD (Secure Digital) memory card. Of course, the removable recording medium 928 may be, for example, an IC (Integrated Circuit) card having mounted thereon a contactless IC chip or an electronic device.

The connecting port 924 is a port for connecting an external connection device 930, e.g., a USB (Universal Serial Bus) port, an IEEE 1394 port, etc. The connection port 924 is a port for connecting the external connection device 930, e.g., an SCSI (Small Computer System Interface), an RS-232C port, an optical audio terminal, etc. The external connection device 930 is, for example, a printer, a portable music player, a digital camera, a digital video camera, or an IC recorder.

The communication unit 926 is a communication device for connecting to a network 932 and is, for example, a communication card for a wired or wireless LAN (Local Area Network) or WUSB (Wireless USB). The communication unit 926 is a router for optical communications, a router for ADSL (Asymmetric Digital Subscriber Line), a modem for various communications, etc. The network 932 connected to the communication unit 926 is configured by a network connected by wire or wirelessly and is, for example, the Internet, an in-home network, infrared ray communication, visible light communication, broadcasting, or satellite communication.

<5. Summary>

Finally, a functional configuration of the information processing apparatus 100 of the present embodiment and actions and effects obtained by the functional configuration will be briefly summarized.

First, the functional configuration of the information processing apparatus 100 according to the present embodiment can be represented as follows. The information processing apparatus 100 has a storage unit 112, a recommendation degree information updating unit 108, a recommended function determining unit 114, and a display control unit 116. In the storage unit 112, function attribute information, user operation information, and recommendation degree information indicating a recommendation degree are stored so as to be associated with one another. The function attribute information indicates an attribute about a function of a predetermined device. The user operation information indicates content of a predetermined user operation input to the predetermined device. The recommendation degree indicates a reference for outputting, on a priority basis, display for recommending use of a corresponding function to a display apparatus. When a user operation that matches the user operation information associated with a piece of function attribute information is input, the recommendation degree information updating unit 108 updates the recommendation degree information to increase the recommendation degree associated with the piece of function attribute information. The recommended function determining unit 114 determines, based on the recommendation degree information recorded in the storage unit 112, a function with the highest recommendation degree as a recommended function, from among functions whose respective pieces of function attribute information are stored in the storage unit 112. The display control unit 116 causes the display apparatus to provide recommendation display for recommending use of the determined recommended function. In this manner, in the information processing apparatus 100, by providing recommendation display on the display apparatus based on the recommendation degree information to recommend a function that is considered to be useful for a user, the convenience of finding a function suitable for the user can be improved.

The functional configuration of the information processing apparatus 100 according to the present embodiment can also be represented as follows. In the information processing apparatus 100, a recommendation display instructing unit 132 can be further included in the above-described functional configuration. In the storage unit 112, trigger information, which indicates content of a user operation which serves as a trigger to cause the display apparatus to provide recommendation display, may be further stored so as to be associated with the function attribute information. When a user operation that matches a user operation associated with the trigger information is input, the recommendation display instructing unit 132 can generate an instruction signal which is a signal for allowing the display control unit 116 to perform control of the display apparatus, and output the instruction signal to the display control unit 116. In response to the instruction signal output from the recommendation display instructing unit 132, the display control unit 116 can cause the display apparatus to provide the recommendation display. In this manner, by an operation performed by the user for a predetermined function acting as a trigger, the display control unit 116 can cause the display apparatus to provide recommendation display. For example, it is assumed that the user is seeing a program guide on a television receiver which is an example of the information processing apparatus 100. By the user returning to the viewing of a program from the viewing of the program guide, a program guide search function can be recommended to the user. Hence, the user can view recommendation display after performing a predetermined user operation 128 and thus can timely execute a recommended function based on the recommendation display. That is, the possibility that recommendation display provided by the information processing apparatus 100 is profitable for the user increases.

The function of the recommendation degree information updating unit 108 of the information processing apparatus 100 according to the present embodiment can also be represented as follows. When a user operation is input to execute by the user the recommended function determined by the recommended function determining unit 114 and the input user operation matches a user operation associated with the function attribute information, the recommendation degree information updating unit 108 can update the recommendation degree information to decrease the recommendation degree. In this manner, when the user executes a function that is recommended once, the recommendation degree information updating unit 108 can decrease the recommendation degree of the function. Therefore, those functions that are recommended once by the information processing apparatus 100 and executed by the user are less likely to be recommended. As a result, the information processing apparatus 100 recommends functions other than the functions and can accordingly recommend even those functions for which a user's usage history does not exist. That is, the user can efficiently learn functions.

The functional configuration of the information processing apparatus 100 according to the present embodiment can also be represented as follows. In the information processing apparatus 100, an external information obtaining unit 106 can be further included in the above-described functional configuration. The external information obtaining unit 106 can record in the storage unit 112 external information that is obtained from one or two or more external devices which are communicable through a network and that includes function attribute information, user operation information, and recommendation degree information of the one or two or more external devices. In this manner, the information processing apparatus 100 can also recommend a function of an external device which is obtained through a network. Hence, in the information processing apparatus 100, by recommending a function of an external device that is considered to be useful for the user, the convenience of finding a function of the external device suitable for the user can also be improved.

The functional configuration of the information processing apparatus 100 according to the present embodiment can also be represented as follows. In the information processing apparatus 100, a latest information updating unit 122 can be further included in the above-described functional configuration. The latest information updating unit 122 can newly obtain the function attribute information, the user operation information, and the recommendation degree information through a network or based on a user input and record the updated function attribute information, the updated user operation information, and the updated recommendation degree information in the storage unit 112. In this manner, the information processing apparatus 100 can update information on functions through a network, etc. Therefore, the information processing apparatus 100 can recommend a function to the user based on user preferences, today's fashion, etc. A newly added function or a function of a newly purchased apparatus can also be recommended to the user by the information processing apparatus 100. Further, the latest information updating unit 122 can eliminate those functions that have become unnecessary.

The function of the recommendation degree information updating unit 108 of the information processing apparatus 100 according to the present embodiment can also be represented as follows. The recommendation degree information updating unit 108 associates first function attribute information of a predetermined function with second function attribute information of a function used in association with the predetermined function. Then, the recommendation degree information updating unit 108 can increase both a recommendation degree associated with the first function attribute information and a recommendation degree associated with the second function attribute information. In this manner, the recommendation degree information updating unit 108 can increase both of recommendation degrees of at least two predetermined functions associated with the function attribute information. For example, as an example of the recommendation degree information updating unit 108, it is assumed that when the user is viewing a television receiver the user makes a viewing reservation for a program. In this case, there may be a case in which it is desirable that the viewing reservation function be used together with a program guide display function, an initialization setting function, etc. In view of this, the recommendation degree information updating unit 108 can increase not only a recommendation degree of the viewing reservation function but also recommendation degrees of the program guide display function, the initialization setting function, etc. When, for example, the user recognizes the viewing reservation function but does not know that the viewing reservation function can be more efficiently used by executing the program guide display function and then executing the viewing reservation function, recommendation of the program guide display function improves the user convenience of using functions.

The function attribute information of the information processing apparatus 100 according to the present embodiment can also be represented as follows. The function attribute information can include function manipulation explanation data which is data on a manipulation explanation of a function of the predetermined device. The display control unit 116 can provide display such that function manipulation explanation display for the function manipulation explanation data is included in the recommendation display. Specifically, when the information processing apparatus 100 is a television receiver, not only display that recommends a function but also display that provides a manipulation explanation of the function can be provided on the display apparatus. Therefore, the user can find a function suitable for him/her without bothering to read a manual in book form, etc. In addition, the user may be allowed to watch a demonstration of a function by viewing video. In that case, learning of the function is speeded up. The user can practice manipulation while watching a manipulation method, which makes it easier for him/her to learn a function manipulation method.

The functional configuration of the information processing apparatus 100 according to the present embodiment can also be represented as follows. In the information processing apparatus 100, a recommendation standard adjusting unit 120, a number-of-executions-of-recommended-function calculating unit 124, and a function usage rate calculating unit 126 can be further included in the above-described functional configuration. The information processing apparatus 100 can further include a number-of-recommended-functions determining unit 134 and a recommendation timing determining unit 136. The number-of-executions-of-recommended-function calculating unit 124 can add up the number of executions of a recommended function which indicates the number of times a function in relation to the recommendation display is executed by a user operation within a predetermined period of time. The function usage rate calculating unit 126 can calculate a function usage rate which indicates a rate of the number of functions for which a usage history exists with respect to the number of all functions recorded in the storage unit 112. The recommendation standard adjusting unit 120 can adjust a recommended function standard in accordance with fluctuations in the number of executions of a recommended function and the function usage rate. The recommended function standard defines the number of functions selectable as a recommended function by the recommended function determining unit 114. The number-of-recommended-functions determining unit 134 can determine the number of functions selectable as a recommended function, based on the recommended function standard. The recommended function determining unit 114 can also determine a function with the highest recommendation degree as a function to be recommended to the user, based on the determination made by the number-of-recommended-functions determining unit 134. In this manner, the number of functions that can be selected by the recommended function determining unit 114 for recommendation can be determined by the number-of-recommended-functions determining unit 134 in accordance with fluctuations in recommended function standard. Specifically, the number of functions that can be selected by the recommended function determining unit 114 for recommendation can increase in accordance with an increase in the number of executions by a user operation and the number of functions for which a usage history exists with respect to the number of all functions recorded in the storage unit 112. Hence, the number of functions that can be selected by the recommended function determining unit 114 for recommendation increases in accordance with an increase in user's usage frequency, and by an increase in user's usage the user can get a feeling as if the information processing apparatus 100 is growing up and thus can accordingly get a sense of attachment to the information processing apparatus 100.

The recommendation standard adjusting unit 120 can also adjust a recommendation timing standard in accordance with fluctuations in the number of executions of a recommended function and the function usage rate. The recommendation timing standard indicates timing at which the display control unit 116 causes the display apparatus to provide the recommendation display. The recommendation timing determining unit 136 can determine timing at which the recommendation display can be provided, based on the recommendation timing standard. Then, the display control unit 116 can cause the display apparatus to provide recommendation display for the recommended function at predetermined timing based on the determination made by the recommendation timing determining unit 136. In this manner, timing required for the recommended function determining unit 114 to make a recommendation can be determined by the recommendation timing determining unit 136 in accordance with fluctuations in recommended function standard. Specifically, the timing required for the recommended function determining unit 114 to make a recommendation can be shortened in accordance with an increase in the number of executions by a user operation and the number of functions for which a usage history exists with respect to the number of all functions recorded in the storage unit 112. Therefore, the time interval for the recommended function determining unit 114 to make a recommendation is shortened in accordance with an increase in user's usage frequency, and by an increase in user's usage the user can get a feeling as if the number of responses from the information processing apparatus 100 is increasing and thus can accordingly get a sense of attachment to the information processing apparatus 100.

It should be understood by those skilled in the art that various modifications, combinations, sub-combinations and alterations may occur depending on design requirements and other factors insofar as they are within the scope of the appended claims or the equivalents thereof.

Although in the above-described embodiment the information processing apparatus 100 is a television receiver, the present invention is not limited thereto. For example, the information processing apparatus 100 may be a personal computer, a mobile phone, a radio, or a portable music player.

The present application contains subject matter related to that disclosed in Japanese Priority Patent Application JP 2009-66785 filed in the Japan Patent Office on Mar. 18, 2009, the entire content of which is hereby incorporated by reference.

What is claimed is:

1. An information processing apparatus comprising:
   circuitry configured to:
   store function attribute information, user operation information, and recommendation degree information are recorded so as to be associated with one another, the function attribute information indicating an attribute about a function of a predetermined device, the user operation information indicating content of a predetermined user operation input to the predetermined device, and the recommendation degree information indicating a recommendation degree which serves as a reference for outputting, on a priority basis, display for recommending use of the function to a display apparatus;
   update, when a user operation that matches the user operation information associated with a piece of function attribute information is input, the recommendation degree information to increase the recommendation degree associated with the piece of function attribute information;
   determine, based on the pieces of recommendation degree information recorded, a function with a highest recommendation degree as a recommended function, from among functions whose respective pieces of function attribute information are stored;
   cause the display apparatus to provide recommendation display for recommending use of the determined recommended function;
   add up a number of executions of a recommended function which indicates a number of times a function in relation to the recommendation display is executed by a user operation within a predetermined period of time;

calculate a function usage rate which indicates a rate of a number of functions for which a usage history exists with respect to a number of all functions recorded; and adjust a recommended function standard in accordance with fluctuations in the number of executions of a recommended function and the function usage rate, the recommended function standard defining a number of functions selectable as a recommended function.

2. The information processing apparatus according to claim 1, wherein the circuitry is further configured to:
record trigger information so as to be associated with the function attribute information, the trigger information indicating content of a user operation which serves as a trigger to cause the display apparatus to provide recommendation display,
generate, when a user operation that matches a user operation associated with the trigger information is input, an instruction signal and outputs the instruction signal, the instruction signal being a signal for allowing control of the display apparatus, and
in response to the instruction signal, cause the display apparatus to provide the recommendation display.

3. The information processing apparatus according to claim 1, wherein the circuitry is further configured to, when a user operation is input to execute the determined recommended function and the input user operation matches a user operation associated with the function attribute information, update the recommendation degree information to decrease the recommendation degree.

4. The information processing apparatus according to claim 1, wherein the circuitry is further configured to record external information that is obtained from one or two or more external devices which are communicable through a network and that includes the function attribute information, the user operation information, and the recommendation degree information of the one or two or more external devices.

5. The information processing apparatus according to claim 1, wherein the circuitry is further configured to newly obtain the function attribute information, the user operation information, and the recommendation degree information through a network or based on a user input and updates the function attribute information, the user operation information, and the recommendation degree information which are recorded.

6. The information processing apparatus according to claim 1, wherein the circuitry is further configured to associate first function attribute information of a predetermined function with second function attribute information of a function used in association with the predetermined function, and when the predetermined function is executed, increase both a recommendation degree associated with the first function attribute information and a recommendation degree associated with the second function attribute information.

7. The information processing apparatus according to claim 1, wherein
the function attribute information includes function manipulation explanation data which is data on a manipulation explanation of a function of the predetermined device, and
the circuitry is further configured to provide display by including function manipulation explanation display for the function manipulation explanation data is included in the recommendation display.

8. The information processing apparatus according to claim 1, wherein the circuitry is further configured to determine a number of functions selectable as a recommended function, based on the recommended function standard.

9. The information processing apparatus according to claim 8, wherein the circuitry is further configured to adjust a recommendation timing standard in accordance with fluctuations in the number of executions of a recommended function and the function usage rate, the recommendation timing standard indicating timing at which the display apparatus provides the recommendation display.

10. The information processing apparatus according to claim 9, wherein the circuitry is further configured to determine timing at which the recommendation display can be provided, based on the recommendation timing standard.

11. The information processing apparatus according to claim 10, wherein the circuitry is further configured to cause the display apparatus to provide recommendation display for the recommended function at predetermined timing based on the determination of the timing at which the recommendation display can be provided.

12. An information processing apparatus comprising:
circuitry configured to:
store function attribute information, user operation information, and recommendation degree information are recorded so as to be associated with one another, the function attribute information indicating an attribute about a function of a predetermined device, the user operation information indicating content of a predetermined user operation input to the predetermined device, and the recommendation degree information indicating a recommendation degree which serves as a reference for outputting, on a priority basis, display for recommending use of the function to a display apparatus;
update, when a user operation that matches the user operation information associated with a piece of function attribute information is input, the recommendation degree information to increase the recommendation degree associated with the piece of function attribute information;
determine, based on the pieces of recommendation degree information recorded, a function with a highest recommendation degree as a recommended function, from among functions whose respective pieces of function attribute information are stored;
cause the display apparatus to provide recommendation display for recommending use of the determined recommended function:
add up a number of executions of a recommended function which indicates a number of times a function in relation to the recommendation display is executed by a user operation within a predetermined period of time;
calculate a function usage rate which indicates a rate of a number of functions for which a usage history exists with respect to a number of all functions recorded;
adjust a recommended function standard in accordance with fluctuations in the number of executions of a recommended function and the function usage rate, the recommended function standard defining a number of functions selectable as a recommended function;
determine a number of functions selectable as a recommended function, based on the recommended function standard; and
determine a function with a highest recommendation degree as a function to be recommended to a user, based on the determination of the number of functions selectable as the recommended function.

13. The information processing apparatus according to claim 12, wherein the circuitry is further configured to adjust a recommendation timing standard in accordance with fluctuations in the number of executions of a recommended function and the function usage rate, the recommendation timing standard indicating timing to cause the display apparatus to provide the recommendation display, determine timing at which the recommendation display can be provided, based on the recommendation timing standard, and cause the display apparatus to provide recommendation display for the recommended function at predetermined timing based on the determination of the timing at which the recommendation display can be provided.

14. An information processing method, comprising the steps of:

based on function attribute information, user operation information, and recommendation degree information which are entered in advance, the function attribute information indicating an attribute about a function of a predetermined device, the user operation information indicating content of a predetermined user operation input to the predetermined device, and the recommendation degree information indicating a recommendation degree which serves as a reference for outputting, on a priority basis, display for recommending use of the function to a display apparatus, updating, when a user operation that matches the user operation information associated with a piece of function attribute information is input, the recommendation degree information to increase the recommendation degree associated with the piece of function attribute information;

determining, based on the recommendation degree information, a function with a highest recommendation degree as a recommended function, from among functions whose respective pieces of function attribute information are entered;

causing the display apparatus to provide recommendation display for recommending use of the determined recommended function;

adding up a number of executions of a recommended function which indicates a number of times a function in relation to the recommendation display is executed by a user operation within a predetermined period of time;

calculating a function usage rate which indicates a rate of a number of functions for which a usage history exists with respect to a number of all functions recorded; and adjusting a recommended function standard in accordance with fluctuations in the number of executions of a recommended function and the function usage rate, the recommended function standard defining a number of functions selectable as a recommended function.

15. A non-transitory storage medium storing instructions which, when executed, cause a computer to perform the method according to claim 14.

* * * * *